(12) United States Patent
Ohno et al.

(10) Patent No.: US 7,556,782 B2
(45) Date of Patent: Jul. 7, 2009

(54) HONEYCOMB STRUCTURED BODY

(75) Inventors: Kazushige Ohno, Gifu (JP); Atsushi Kudo, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 376 days.

(21) Appl. No.: 11/340,591

(22) Filed: Jan. 27, 2006

(65) Prior Publication Data
US 2006/0188415 A1  Aug. 24, 2006

(51) Int. Cl.
B01D 50/00 (2006.01)
(52) U.S. Cl. ...................................................... 422/180
(58) Field of Classification Search ................. 422/168, 422/177, 180
See application file for complete search history.

(56) References Cited
U.S. PATENT DOCUMENTS

| | | | |
|---|---|---|---|
| 4,276,071 A | | 6/1981 | Outland |
| 4,364,761 A | | 12/1982 | Berg et al. |
| 4,416,676 A | | 11/1983 | Montierth |
| 4,417,908 A | | 11/1983 | Pitcher, Jr. |
| 4,420,316 A | | 12/1983 | Frost et al. |
| 4,643,749 A | | 2/1987 | Miura |
| 4,767,309 A | * | 8/1988 | Mizuno et al. ............... 425/461 |
| 4,857,089 A | | 8/1989 | Kitagawa et al. |
| 5,545,243 A | | 8/1996 | Kotani et al. |
| 5,914,187 A | * | 6/1999 | Naruse et al. ................ 428/327 |
| 5,930,994 A | | 8/1999 | Shimato et al. |
| 6,149,877 A | | 11/2000 | Ogai |
| 6,395,370 B1 | | 5/2002 | Noda et al. |
| 6,447,564 B1 | | 9/2002 | Ohno et al. |
| 6,565,630 B2 | | 5/2003 | Ohno et al. |
| 6,669,751 B1 | | 12/2003 | Ohno et al. |
| 6,696,132 B2 | | 2/2004 | Beall et al. |
| 6,716,512 B2 | | 4/2004 | Yamamoto et al. |
| 6,770,116 B2 | | 8/2004 | Kojima |
| 6,939,825 B1 | | 9/2005 | Ohno et al. |

(Continued)

FOREIGN PATENT DOCUMENTS

DE  10037403  2/2002

(Continued)

OTHER PUBLICATIONS

Yamada, "Honeycomb Structured Body", U.S. Appl. No. 11/225,197, filed Sep. 14, 2005.

(Continued)

*Primary Examiner*—Tom Duong
(74) *Attorney, Agent, or Firm*—Finnegan, Henderson, Farabow, Garrett & Dunner LLP

(57) ABSTRACT

A honeycomb structured body of the present invention is a pillar-shaped honeycomb structured body comprising a large number of through holes that are longitudinally placed in parallel with one another with a partition wall therebetween, wherein the large number of through holes include a group of large-capacity through holes being sealed at one of end portions so that the sum of areas on a cross section perpendicular to the longitudinal direction is made relatively larger, and a group of small-capacity through holes being sealed at the other end portion so that the sum of areas on the cross section is made relatively smaller, and the partition wall that separates the adjacent through holes constituting the group of large-capacity through holes is provided with a selective catalyst supporting portion used for selectively supporting a catalyst.

24 Claims, 7 Drawing Sheets

U.S. PATENT DOCUMENTS

| | | |
|---|---|---|
| 2002/0045541 A1 | 4/2002 | Koike et al. |
| 2002/0180117 A1 | 12/2002 | Yamamoto et al. |
| 2003/0041730 A1 | 3/2003 | Beall et al. |
| 2003/0167755 A1 | 9/2003 | Nakatani et al. |
| 2004/0031264 A1 | 2/2004 | Kojima |
| 2004/0033175 A1 | 2/2004 | Ohno et al. |
| 2004/0055265 A1 | 3/2004 | Ohno et al. |
| 2004/0097370 A1 | 5/2004 | Ichikawa et al. |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0076626 A1 | 4/2005 | Kudo et al. |
| 2005/0076627 A1 | 4/2005 | Itou et al. |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0159310 A1 | 7/2005 | Ohno et al. |
| 2005/0160710 A1 | 7/2005 | Taoka et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0235621 A1 | 10/2005 | Kunieda et al. |
| 2005/0247038 A1 | 11/2005 | Takahashi |
| 2005/0272602 A1 | 12/2005 | Ninomiya |
| 2006/0019061 A1 | 1/2006 | Oshimi |
| 2006/0029897 A1 | 2/2006 | Saijo et al. |
| 2006/0029898 A1 | 2/2006 | Saijo et al. |
| 2006/0032203 A1 | 2/2006 | Komori et al. |
| 2006/0043652 A1 | 3/2006 | Saijo et al. |
| 2006/0059877 A1 | 3/2006 | Yoshida |
| 2006/0068159 A1 | 3/2006 | Komori et al. |
| 2006/0073970 A1 | 4/2006 | Yamada |
| 2006/0093784 A1 | 5/2006 | Komori et al. |
| 2006/0154021 A1 | 7/2006 | Ohno et al. |
| 2006/0159602 A1 | 7/2006 | Ohno et al. |
| 2006/0166820 A1 | 7/2006 | Ogyu et al. |
| 2008/0017572 A1 | 1/2008 | Kudo |

FOREIGN PATENT DOCUMENTS

| | | |
|---|---|---|
| EP | 0 089 751 | 9/1983 |
| EP | 0 277 012 | 8/1988 |
| EP | 0 658 363 | 6/1995 |
| EP | 1 142 619 | 10/2001 |
| EP | 1 170 270 | 1/2002 |
| EP | 1 174 399 | 1/2002 |
| EP | 1214973 A1 * | 6/2002 |
| EP | 1 447 535 | 8/2004 |
| EP | 1502639 A1 * | 2/2005 |
| FR | 2789327 | 8/2000 |
| FR | 2 840 545 | 12/2003 |
| GB | 2 064 360 | 6/1981 |
| JP | 56-124417 | 9/1981 |
| JP | 56-124418 | 9/1981 |
| JP | 58-92409 | 6/1983 |
| JP | 58-150015 | 9/1983 |
| JP | 58-196820 | 11/1983 |
| JP | 61-424 | 1/1986 |
| JP | 62-96717 | 5/1987 |
| JP | 63-185425 | 8/1988 |
| JP | 3-49608 | 7/1991 |
| JP | 3-102016 | 10/1991 |
| JP | 5-68828 | 3/1993 |
| JP | 6-47620 | 6/1994 |
| JP | 7-163823 | 6/1995 |
| JP | 08-299809 | 11/1996 |
| JP | 10-263416 | 10/1998 |
| JP | 3130587 | 11/2000 |
| JP | 2001-96117 | 4/2001 |
| JP | 2001-162121 | 6/2001 |
| JP | 2001-199777 | 7/2001 |
| JP | 2001-206780 | 7/2001 |
| JP | 2001-246250 | 9/2001 |
| JP | 2001-334114 | 12/2001 |
| JP | 2002-177793 | 6/2002 |
| JP | 2003-1029 | 1/2003 |
| JP | 2003-49627 | 2/2003 |
| JP | 2003-155908 | 5/2003 |
| JP | 2004-896 | 1/2004 |
| WO | WO 01/23069 | 4/2001 |
| WO | WO 01/53232 | 7/2001 |
| WO | WO 02/10562 | 2/2002 |
| WO | WO 02/096827 | 12/2002 |
| WO | WO 02/100514 | 12/2002 |
| WO | WO 03/014539 | 2/2003 |
| WO | WO 03/020407 | 3/2003 |
| WO | WO 03/044338 | 5/2003 |
| WO | WO 03/080218 | 10/2003 |

OTHER PUBLICATIONS

Yoshida, "Honeycomb Structured Body", U.S. Appl. No. 11/368,401, filed Mar. 7, 2006.

Ohno et al., "Honeycomb Structured Body", U.S. Appl. No. 11/341,507, filed Jan. 30, 2006.

PCT International Preliminary Report on Patentability.

Ohno et al., "Catalyst and Method of Producing the Same," U.S. Appl. No. 10/129,126, filed Jul. 12, 2002.

Taoka et al., "Ceramic Filter for Exhaust Gas Emission Control," U.S. Appl. No. 10/502,044, filed Jul. 29, 2004.

Takahashi, "Manufacturing Method of Honeycomb Structural Body, and Sealing Material," filed Jan. 3, 2005.

Saijo et al., U.S. Appl. No. 11/174,483, filed Jul. 6, 2005.

* cited by examiner

A-A Line cross-sectional view

HONEYCOMB STRUCTURED BODY

CROSS-REFERENCE TO RELATED APPLICATIONS

This application claims benefit of priority based on JP-A 2003-359235 filed on Oct. 20, 2003, JP-A 2003-362512 filed on Oct. 22, 2003 and PCT/JP2004/015507 filed on Oct. 20, 2004. The contents of these applications are incorporated herein by reference in their entirety.

BACKGROUND OF THE INVENTION

1. Field of the Invention

The present invention relates to a honeycomb structured body used as a filter for removing particulates and the like contained in exhaust gases, a catalyst supporting member, and the like.

2. Discussion of the Background

In recent years, particulates such as soot and the like contained in exhaust gases discharged from internal combustion engines of vehicles, such as buses and trucks, and construction machines, have raised serious problems as those particulates are harmful to the environment and the human body.

There have been proposed various honeycomb structured bodies made from porous ceramics, which serve as filters capable of collecting particulates in exhaust gases to convert the exhaust gases.

Conventionally, with respect to the honeycomb structured body of this type, a filter having the following structure has been proposed: two kinds of through holes, that is, a group of through holes with a relatively large capacity (hereinafter, referred to as large-capacity through hole) and a group of through holes with a relatively small capacity (hereinafter, referred to as small-capacity through hole), are prepared, and each of the large-capacity through holes is sealed with a plug at one of ends, and each of the small-capacity through holes is sealed with a plug at the other opposite end. Moreover, the honeycomb structured body that is designed to have another structure in which the large-capacity through hole has an opening on a gas inlet side of a filter while the small-capacity through hole has an opening on a gas outlet side of the filter has been proposed (for example, see JP-A56-124418, JP-A62-96717, JUM-A58-92409, U.S. Pat. No. 4,416,676, JP-A 58-196820, U.S. Pat. No. 4,420,316, JP-A 58-150015, JP-A 5-68828, French Patent No. 2789327, International Publication No. WO02/100514, International Publication No. WO02/10562, and International Publication No. WO03/20407).

There have been also known filters and the like having a structure in which the number of through holes that have openings on the gas inlet side (hereinafter, referred to as inlet-side through holes) is made greater than the number of through holes that have openings on the gas outlet side (hereinafter, referred to as outlet-side through holes) so that the total amount of surface areas on the inlet-side through holes is made relatively greater than the total amount of surface areas on the outlet-side through holes (for example, see FIG. 3 of JP-A 58-196820).

When viewed from the end face, these honeycomb structured bodies are constituted by two types of through holes, that is, a group of large-capacity through holes (the total amount of rates of surface area/cross-sectional area of the through holes is relatively large) and a group of small-capacity through holes (the total amount of rates of surface area/cross-sectional area of the through holes is relatively small).

The contents of JP-A 56-124418, JP-A 62-96717, JUM-A 58-92409, U.S. Pat. No. 4,416,676, JP-A 58-196820, U.S. Pat. No. 4,420,316, JP-A58-150015, JP-A5-68828, French Patent No. 2789327, International Publication No. WO02/100514, International Publication No. WO02/10562, and International Publication No. WO03/20407 are incorporated herein by reference in their entirety.

SUMMARY OF THE INVENTION

In accordance with a first aspect of the present invention, provided is
a pillar-shaped honeycomb structured body comprising a large number of through holes that are longitudinally placed in parallel with one another with a partition wall therebetween,
wherein
the large number of through holes include a group of large-capacity through holes being sealed at one of the end portions so that the sum of areas on a cross section perpendicular to the longitudinal direction is made relatively larger, and a group of small-capacity through holes being sealed at the other end portion so that the sum of areas on the cross section is made relatively smaller, and
the partition wall that separates the adjacent through holes constituting the group of large-capacity through holes is provided with a selective catalyst supporting portion used for selectively supporting a catalyst.

In the honeycomb structured body in accordance with the first aspect of the present invention, desirably, a catalyst is supported at least on the selective catalyst supporting portion, and the catalyst comprises at least one kind selected from the group consisting of a noble metal, an alkali metal, an alkaline earth metal, a rare-earth element, and a transition metal element. Furthermore, it is desirable that the noble metal comprises at least one kind selected from the group consisting of platinum, palladium, and rhodium.

Moreover, desirably, the selective catalyst supporting portion is a protruded portion and/or a recessed portion formed on the partition wall that separates adjacent through holes constituting the group of large-capacity through holes. The protruded portion formed on the partition wall that separates adjacent through holes constituting the group of large-capacity through holes desirably has a shape widened toward the base, while a number of protruded portions are desirably formed on each of the partition walls so as to prepare a corrugated surface on each of the partition walls. On the other hand, the shape of the recessed portion formed on the partition wall that separates adjacent through holes constituting the group of large-capacity through holes is desirably a concave shape or a grooved shape, while it is desirable that the protruded portion and/or recessed portion formed on the partition wall that separates adjacent through holes constituting the group of large-capacity through holes are continuously formed from the end on the inlet side of the through hole to the end on the outlet side of the through hole.

In the honeycomb structured body in accordance with the first aspect of the present invention, desirably, the protruded portion formed at the selective catalyst supporting portion has a height of at least about 0.02 time and at most about 6 times the thickness of the partition wall that separates adjacent through holes constituting the group of large-capacity through holes, and the recessed portion formed at the selective catalyst supporting portion has a depth of at least about 0.02 time and at most about 0.4 time the thickness of the partition wall that separates adjacent through holes constituting the group of large-capacity through holes.

Furthermore, it is desirable that a thickness of a partition wall that separates adjacent through holes constituting the group of large-capacity through holes is at least about 0.2 mm and at most about 1.2 mm. It is also desirable that a thickness of a partition wall that separates adjacent through holes constituting the group of large-capacity through holes is formed to be thicker than a thickness of a partition wall that separates adjacent through holes constituting the group of large-capacity through holes and through holes constituting the group of small-capacity through holes.

In the honeycomb structured body in accordance with the first aspect of the present invention, desirably, the through holes that constitute the group of large-capacity through holes and/or the through holes that constitute the group of small-capacity through holes have a cross-sectional shape perpendicular to the longitudinal direction thereof which is a polygonal shape.

In the honeycomb structured body in accordance with the first aspect of the present invention, desirably, the cross-sectional shape perpendicular to the longitudinal direction of the through holes that constitute the group of large-capacity through holes is an octagonal shape, and the cross-sectional shape perpendicular to the longitudinal direction of the through holes that constitute the group of small-capacity through holes is a quadrangular shape.

In the honeycomb structured body in accordance with the first aspect of the present invention, desirably, a ratio of the sum of areas on a cross section perpendicular to the longitudinal direction of the through holes that constitute the group of large-capacity through holes to the sum of areas on the cross section perpendicular to the longitudinal direction of the through holes that constitute the group of small-capacity through holes is at least about 1.5 and at most about 2.7.

It is desirable that the honeycomb structured body in accordance with the first aspect of the present invention is mainly made from a porous ceramic material, and that the honeycomb structured body comprises at least one kind selected from the group consisting of nitride ceramics, carbide ceramics, or oxide ceramics. Moreover, desirably, a porosity of the honeycomb structured body is at least about 20% and at most about 80%, while an average pore diameter of the honeycomb structured body is at least about 1 μm and at most about 100 μm.

In the honeycomb structured body in accordance with the first aspect of the present invention, desirably, on the cross section perpendicular to the longitudinal direction, at least one of angles formed by crossing of the partition wall that separates adjacent through holes constituting the group of large-capacity through holes and the partition wall that separates adjacent through holes, one of which constituting the group of large-capacity through holes and the other of which constituting the group of small-capacity through holes, is an obtuse angle.

In the honeycomb structured body in accordance with the first aspect of the present invention, desirably, on the cross section perpendicular to the longitudinal direction, the vicinity of each of corners of the through hole constituting the group of the large-capacity through holes and/or the through hole constituting the group of the small-capacity through holes is formed by a curved line.

In the honeycomb structured body in accordance with the first aspect of the present invention, desirably, the distance between centers of gravity on a cross section perpendicular to the longitudinal direction of adjacent through holes constituting the group of the large-capacity through holes is equal to the distance between centers of gravity on across section perpendicular to the longitudinal direction of adjacent through holes constituting the group of the small-capacity through holes.

In accordance with a second aspect of the present invention, provided is a honeycomb structured body comprising: a honeycomb block formed by combining a plurality of the honeycomb structured bodies according to the first aspect of the present invention together through a sealing material layer; and a sealing material layer which is formed on the peripheral face of the honeycomb block, wherein the sealing material layer is made from a material that hardly lets gases pass through in comparison with the honeycomb structured body.

In addition to the case where the honeycomb structured bodies of the first aspect of the present invention are used as constituent members for the honeycomb structured body in accordance with the second aspect of the present invention, only a single honeycomb structured body of the first aspect of the present invention may be used for a filter.

In the following description, a honeycomb structured body having a structure as one integral unit as a whole, that is, the honeycomb structured body in accordance with the first aspect of the present invention, is also referred to as an integral honeycomb structured body, and a honeycomb structured body having a structure in which a plurality of ceramic members are combined together through a sealing material layer, that is, the honeycomb structured body in accordance with the second aspect of the present invention, is also referred to as an aggregated honeycomb structured body. Here, in the case where no discrimination is required between the integral honeycomb structured body and the aggregated honeycomb structured body, the corresponding structured body is referred to as a honeycomb structured body.

The honeycomb structured body according to the first or second aspect or the present invention is desirably used for an exhaust gas purifying (converting) device in a vehicle.

DESCRIPTION OF THE EMBODIMENTS

In the integral honeycomb structured body of the present invention, provided is a pillar-shaped honeycomb structured body comprising a large number of through holes that are longitudinally placed in parallel with one another with a partition wall therebetween, wherein the large number of through holes include a group of large-capacity through holes being sealed at one of the end portions so that the sum of areas on a cross section perpendicular to the longitudinal direction is made relatively larger, and a group of small-capacity through holes being sealed at the other end portion so that the sum of areas on the cross section is made relatively smaller, and the partition wall that separates the adjacent through holes constituting the group of large-capacity through holes is provided with a selective catalyst supporting portion used for selectively supporting a catalyst.

With respect to combinations between the group of large-capacity through holes and the group of small-capacity through holes, the following combinations are proposed: (1) individual through hole constituting the group of large-capacity through holes and individual through hole constituting the group of small-capacity through holes have the equal area of the cross section perpendicular to the longitudinal direction, with the number of the through holes constituting the group of large-capacity through holes being greater; (2) individual through hole constituting the group of large-capacity through holes and individual through hole constituting the group of small-capacity through holes are different from each other in the area of the cross section perpendicular to the longitudinal direction, with the numbers of the through holes of the two types being different from each other; and (3) individual through hole constituting the group of large-capacity through holes has a larger area of the cross section compared to individual through hole constituting the group of small-capacity through holes, with the numbers of the though holes of the two types being the same.

Moreover, with respect to the through holes constituting the group of large-capacity through holes and/or the through holes constituting the group of small-capacity through holes, through holes of one type having the same shape and the same area in the cross section perpendicular to the longitudinal direction may be used, or through holes of two or more types having different shapes and different areas in the cross section perpendicular to the longitudinal direction may be used.

Figure 8:
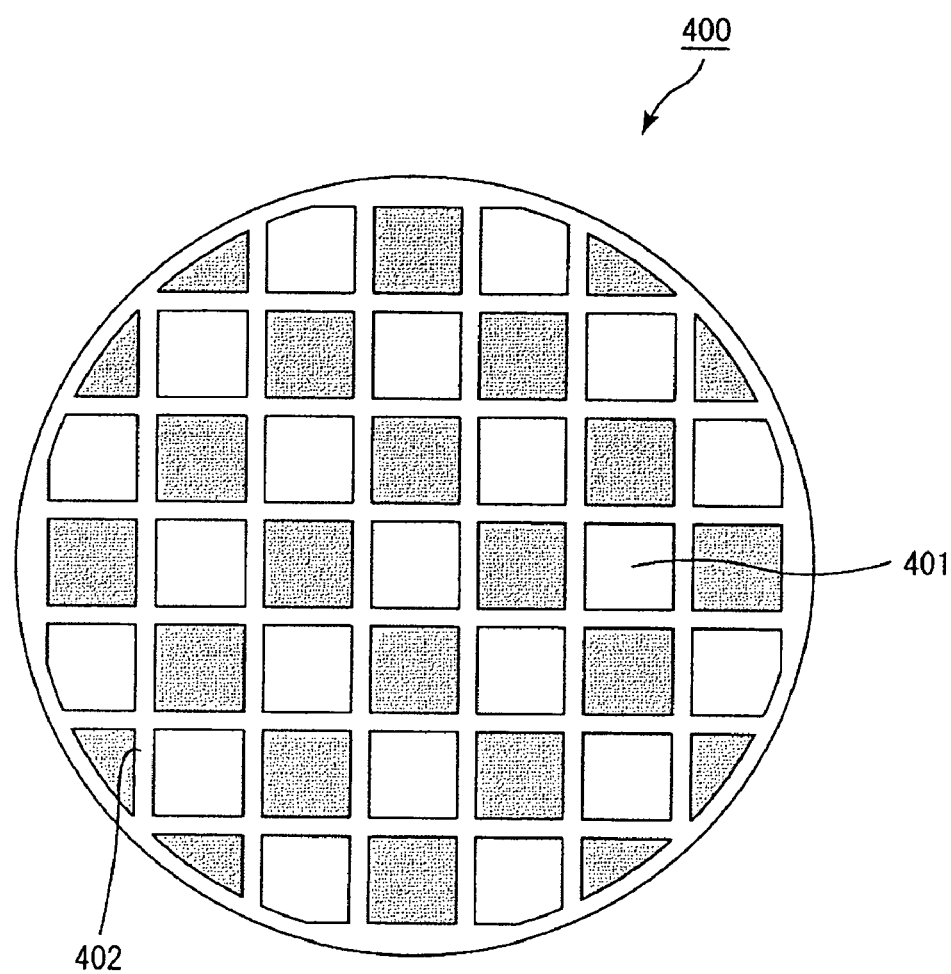
FIG. 8 is a cross-sectional view that schematically shows one example of a conventional honeycomb structured body.

In the honeycomb structured body of the present invention, the shape serving as a basic unit is repeated, and in view of the basic unit, the ratios of areas of the cross section are different from each other. In this case, however, in portions closer to the periphery, there is a basic unit with a portion chipped and this part is not conformed to the above-mentioned rule. Therefore, when measurements are strictly carried out up to one or two cells on the periphery, the calculations need to be carried out by excluding the one or two cells, or the calculations need to be carried out excluding portions that are not repetitions of the basic units. More specifically, for example, as shown in FIG. 8, a honeycomb structured body having a structure in which: the shapes of a cross section perpendicular to the longitudinal direction of the through holes are the same except for those in the vicinity of the periphery; one of ends of the through holes having the same cross-sectional shape is sealed: and sealed portions and opened portions of each of the ends are placed in a manner so as to form a checked pattern as a whole, is not included in the honeycomb structured body of the present invention.

Figure 1A:
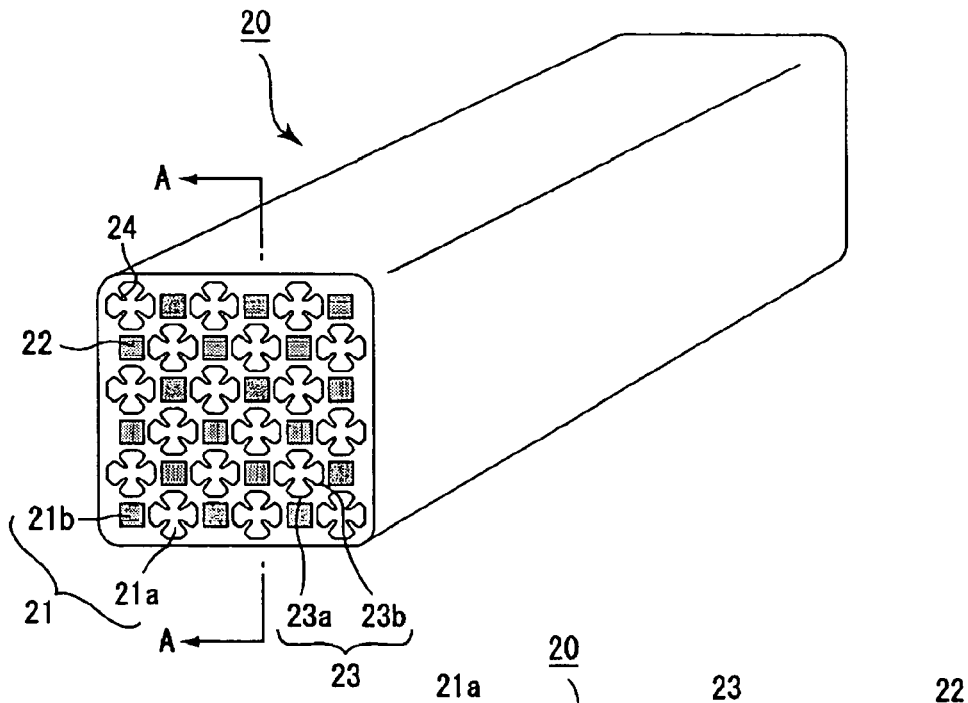
FIG. 1A is a perspective view that schematically shows one example of an integral honeycomb structured body of the present invention.
Figure 1B:
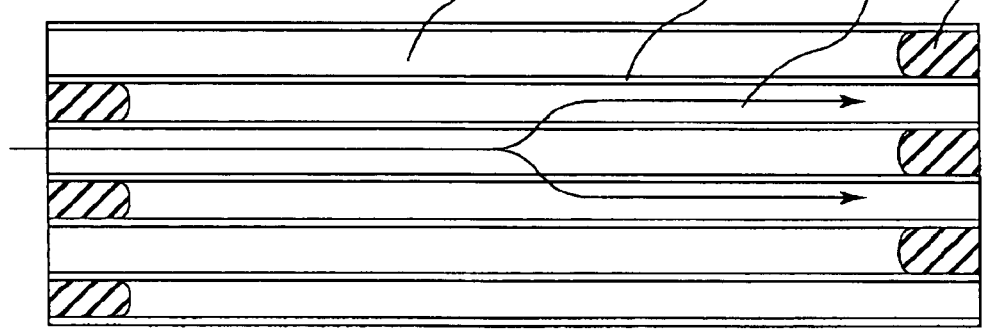
FIG. 1B is a cross-sectional view taken along line A-A of the integral honeycomb structured body of the present invention shown in FIG. 1A.
Figure 1C:
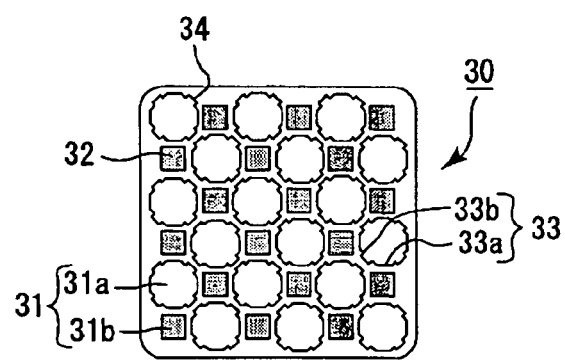
FIG. 1C is a front view that schematically shows another example of the integral honeycomb structured body of the present invention.

FIG. 1A is a perspective view that schematically shows one example of an integral honeycomb structured body of the present invention, FIG. 1B is a cross-sectional view taken along line A-A of the integral honeycomb structured body of the present invention shown in FIG. 1A, and FIG. 1C is a front view that schematically shows another example of the integral honeycomb structured body of the present invention.

In view of the combinations of the group of large-capacity through holes and the group of small-capacity through holes, integral honeycomb structured bodies 20 and 30, shown in FIGS. 1A to 1C, correspond to the above-mentioned combination (3). In other words, in comparison with the individual through hole constituting the large-capacity through holes and the individual through hole constituting the small-capacity through holes, the area of the cross section of the through hole constituting the group of the large-capacity through holes is larger, with the numbers of the though holes of the two types being the same.

In the following, the through holes constituting the large-capacity through holes are also simply referred to as large-capacity through holes, and the through holes constituting the small-capacity through holes are also simply referred to as small-capacity through holes.

As shown in FIGS. 1A and 1B, the integral honeycomb structured body 20 having an approximately square pillar shape comprises a number of through holes 21 longitudinally placed in parallel together with a partition wall 23 interposed therebetween. The through holes 21 include two kinds of through holes, that is, large-capacity through holes 21a with ends on the gas outlet side of the integral honeycomb structured body 20 sealed with plugs 22 and small-capacity through holes 21b with ends on the gas inlet side of the integral honeycomb structured body 20 sealed with plugs 22, and the area on the cross section perpendicular to the longitudinal direction of the large-capacity through holes 21a is made relatively greater in comparison with that of the small-capacity through holes 21b. The partition wall 23 that separates these through holes 21 from each other is allowed to serve as a filter. In other words, exhaust gases that have entered the large-capacity through holes 21a are allowed to flow out of the small-capacity through holes 21b after always passing through the partition wall 23.

In this integral honeycomb structured body 20, a selective catalyst supporting portion, prepared as a protruded portion 24, is formed on the partition wall 23b that separates adjacent large-capacity through holes 21a from each other.

Moreover, as shown in FIG. 1C, an integral honeycomb structured body 30 according to another embodiment comprises a number of through holes 31 longitudinally placed in parallel together with a partition wall 33 interposed therebetween, and the through holes 31 include two kinds of through holes, that is, large-capacity through holes 31a with ends on the gas outlet side sealed with plugs 32 and small-capacity through holes 31b with ends on the gas inlet side sealed with plugs 32. The area on the cross section perpendicular to the longitudinal direction of the large-capacity through holes 31a is made relatively larger in comparison with that of the small-capacity through holes 31b. The partition wall 33 that separates these through holes 31 from each other is allowed to serve as a filter. In other words, exhaust gases that have entered the large-capacity through holes 31a are allowed to flow out of the small-capacity through holes 31b after always passing through the partition wall 33.

In this integral honeycomb structured body 30, a selective catalyst supporting portion, prepared as a recessed portion 34, is formed on the partition wall 33b that separates adjacent large-capacity through holes 31a from each other.

As described above, in the integral honeycomb structured body 20, 30 of the present invention, a selective catalyst supporting portion used for selectively supporting a catalyst is formed on the partition wall that separates adjacent large-capacity through holes 21a, 31a. The selective catalyst supporting portion is not particularly limited as long as it is formed on the partition wall 23b, 33b that separates adjacent large-capacity through holes 21a, 31a from each other so as to selectively (in a concentrating manner) support a catalyst. For example, a protruded portion 24 as shown in FIG. 1A or a recessed portion 34 as shown in FIG. 1C may be used, or a roughened surface or the like, in which the surface roughness of the partition wall 23b, 33b is increased, may also be used.

In the structure in which the protruded portion 24 is formed on the partition wall 23b, when the base member of a honeycomb structured body is impregnated with a solution containing a catalyst or a catalyst material and then taken out, the droplets of the solution are retained on the periphery of the protruded portion 24 by the use of surface tension of the solution; thereafter, by heating and drying the resulting base member, a large amount of catalyst can be supported on the protruded portion 24 and the vicinity thereof. Moreover, when the protruded portion 24 is formed on the partition wall 23b, it is possible to improve the thermal conductivity and also to increase the regenerating rate.

With respect to the shape of the protruded portion 24 to be formed on the partition wall 23b that separates adjacent large-capacity through holes 21a from each other, although not particularly limited, a shape which easily maintains droplets and ensures a certain degree of strength is desirable and, more specifically, a shape widened toward the base is desirable. The protruded portion having the widened shape toward the base easily provides higher strength in comparison with a protruded portion that is thinly elongated. Moreover, the protruded portion is desirably formed continuously from the end on the inlet side of the integral honeycomb structured body 20 to the end on the outlet side thereof. This structure provides high strength and allows a forming process through extrusion molding.

With respect to the height of the protruded portion 24, although not particularly limited, a desirable lower limit thereof is about 0.02 time the thickness of the partition wall 23b that separates adjacent large-capacity through holes 21a from each other, and a desirable upper limit is about 6 times the thickness thereof. When the height is at least about 0.02 time and at most about 6 times, a sufficient amount of catalyst can be supported on the protruded portion 24 and the vicinity thereof. Moreover, strength of the protruded portion 24 becomes sufficient enough to prevent breakage of the honeycomb structured body due to pressure or the like of exhaust gases.

The number of the protruded portions 24 is not particularly limited, and one protruded portion 24 may be attached to each of the partition walls 23b that respectively separate adjacent large-capacity through holes 21a from each other, or a plurality of them may be attached. Among these structures, a structure in which a number of protruded portions are formed on each of the partition walls 23b that respectively separate adjacent large-capacity through holes 21a from each other so as to prepare a corrugated surface on each of the partition walls 23b may increase an amount of droplets retained on each of the partition walls 23b, and consequently support a sufficient amount of catalyst.

In the structure in which the recessed portion 34 is formed on the partition wall 33b, when a base member of the honeycomb structured body is impregnated with a solution containing a catalyst or a catalyst material and then taken out, the droplets of the solution are retained in the recessed portion (groove) 34 by the use of surface tension of the solution; thereafter, by heating and drying the resulting base member, a large amount of catalyst can be supported on the recessed portion 34.

With respect to the shape of the recessed portion 34, although not particularly limited, a shape which easily retains droplets is desirable and, more specifically, a concave shape and a grooved shape are desirable. Further, a grooved shape continuously formed from the end on the inlet side of the integral honeycomb structured body 20 to the end on the outlet side thereof is desirable. This structure allows a forming process through extrusion molding.

With respect to the depth of the recessed portion 34, although not particularly limited, a desirable lower limit thereof is about 0.02 time the thickness of the partition wall 33a that separates adjacent large-capacity through holes 31a from each other, and a desirable upper limit is about 0.4 time the thickness thereof. When the depth is at least about 0.02 time and at most about 0.4 time the thickness, a sufficient amount of catalyst can be supported on the recessed portion 34 and the vicinity thereof. Moreover, strength of the partition wall 33a becomes sufficient, and the honeycomb structured body can be prevented from breaking due to pressure or the like of exhaust gases.

The number of the recessed portions 34 is not particularly limited, and one recessed portion 34 may be formed at each of the partition walls 33a that respectively separate adjacent large-capacity through holes 31a from each other, or a plurality of them may be formed.

The thickness of the partition wall 23b, 33b that separates adjacent large-capacity through holes 21a, 31a from each other is not particularly limited, and the lower limit thereof is desirably about 0.2 mm, and the upper limit thereof is desirably about 1.2 mm. When the thickness is at least about 0.2 mm and at most about 1.2 mm, a sufficient amount of catalyst can be supported on the partition wall 23b, 33b that separates adjacent large-capacity through holes 21a, 31a from each other, and strength in the integral honeycomb structured body 20, 30 becomes sufficient. Moreover, since the gas permeability of the partition wall 23b that separates adjacent large-capacity through holes 21a from each other is not easily reduced, a subsequent reduction is also difficult to occur in the exhaust gas purifying (converting) performance. Therefore, it also becomes difficult for the pressure loss of the integral honeycomb structured body 20, 30 to increase.

The thickness of the partition wall 23a, 33a that separates adjacent large-capacity through hole 21a, 31a and small-capacity through hole 21b, 31b is not particularly limited, and the lower limit thereof is desirably about 0.2 mm, and the upper limit thereof is desirably about 1.2 mm. When the thickness is at least about 0.2 mm and at most about 1.2 mm, a sufficient amount of catalyst can be supported on the partition wall 23a, 33a that separates adjacent large-capacity through hole 21a, 31a and small-capacity through hole 21b, 31b, and strength of the integral honeycomb structured body 20, 30 becomes sufficient. Moreover, since the gas permeability of the partition wall 23a, 33a that separates adjacent large-capacity through hole 21a, 31a and small-capacity through hole 21b, 31b is not easily reduced, a subsequent reduction is also difficult to occur in the exhaust gas purifying (converting) performance. Therefore, it also becomes difficult for the pressure loss of the integral honeycomb structured body 20, 30 to increase.

Here, the partition wall 23b, 33b that separates adjacent large-capacity through holes 21a, 31a from each other is desirably made thicker than the partition wall 23a, 33a that separates adjacent large-capacity through hole 21a, 31a and small-capacity through hole 21b, 31b. By making the partition wall 23b, 33b thick, it becomes possible to support a large amount of catalyst on the partition wall 23b, 33b. Since the partition wall 23b, 33b is the partition wall that separates inlet-side through holes from each other, the influences on the pressure loss is small even when the thickness thereof is increased so as to support a large amount of catalyst thereon.

In the integral honeycomb structured body, since a selective catalyst supporting portion used for selectively supporting a catalyst is formed on the partition wall that separates adjacent large-capacity through holes from each other, exhaust gases are first allowed to flow into the partition wall having no selective catalyst supporting portion, that is, the partition wall (partition wall B) that separates adjacent large-capacity through hole and small-capacity through hole, and particulates accumulate on the partition wall.

The exhaust gases are also allowed to flow into the partition wall (partition wall A) that separates adjacent large-capacity through holes from each other since the pressure loss is higher after a certain degree of particulates accumulate on the partition wall (partition wall B) that separates adjacent large-capacity through hole and small-capacity through hole. In particular, when regenerating the filter, HC, CO and the like in the exhaust gases are oxidized, and heat is generated through the oxidizing reaction to cause a temperature rise in the filter, so that the particulates accumulated thereon are easily burned.

After the particulates are burned, the pressure loss is lowered to allow the exhaust gases to flow into the partition wall B. Thereafter, the above-mentioned processes are repeated.

Therefore, the partition wall A has a function (heat supplying function) of increasing the temperature by supplying heat to the filter, and the partition wall B has a function (pressure loss increase suppressing function) of suppressing an increase in the pressure loss in the filter by allowing the exhaust gases to pass through at the time of both particulate accumulation and burning. Here, since the partition wall A is a partition wall that hardly lets exhaust gases pass through inherently, this partition wall is less likely to contribute to an increase in the pressure loss even when a catalyst that needs to be supported in a large amount, such as NOx absorbing catalyst, is supported. Moreover, when the particulates are burned to generate ashes, since the partition wall A tends to allow the burning of the particulates on the catalyst, the ashes accumulate on the partition wall A while being adhered thereto. However, since the partition wall A is a partition wall that hardly contributes to an increase in the pressure loss as described earlier, the pressure loss hardly occurs even when the ashes deposit thereon.

Moreover, the ashes deposited on the partition wall A also prevent a temperature drop on the partition wall A to secure the heat supplying function. On the other hand, the ashes on the partition wall B, generated through the burning of particulates due to heat supplied from the partition wall A, are easily separated since the amount of the catalyst adhered to the surface of the partition wall B is small, and easily scattered toward the rear of the filter by the passing exhaust gases and deposited thereon. Thus, it is possible to suppress an increase in the pressure loss due to the partition wall B.

In the integral honeycomb structured body of the present invention, a catalyst is supported at least on the selective catalyst supporting portion. Here, the catalyst may of course be supported on a portion other than the selective catalyst supporting portion, and is desirably supported on the partition wall inside the large-capacity through holes.

With respect to the catalyst, although not particularly limited, those which can reduce activating energy of burning particulates or can convert toxic gas components in exhaust gases such as CO, HC and NOx are desirably used, and examples thereof may include noble metals such as platinum, palladium and rhodium, and the like. Among these, a so-called three-way catalyst, made from platinum, palladium and rhodium, is desirably used. Moreover, in addition to the noble metal, an element, such as an alkali metal (Group 1 in Element Periodic Table), an alkali earth metal (Group 2 in Element Periodic Table), a rare-earth element (Group 3 in Element Periodic Table) and a transition metal element may be supported thereon.

The above-mentioned catalyst may be supported on the surface of each of pores inside the partition wall, or may be supported on the partition wall with a certain thickness. Moreover, the above-mentioned catalyst may be supported on the surface of the partition wall and/or the surface of each of pores uniformly, or may be supported on a certain fixed place thereof in a biased manner. Here, the same is true for the partition wall that constitutes the selective catalyst supporting portion.

Among these, the catalyst is desirably supported on the surface of the partition wall, and a large amount of the catalyst is more desirably supported on the surface of the selective catalyst supporting portion. This arrangement easily makes the catalyst and particulates in contact with each other, thereby making it possible to carry out the purifying (converting) process of exhaust gases effectively.

Moreover, when applying the catalyst to the integral honeycomb structured body, it is desirable to apply the catalyst after the surface thereof is coated with a support member such as alumina. With this arrangement, the specific surface area is made greater so that the degree of dispersion of the catalyst is improved and the reaction sites of the catalyst are increased. Since it is possible to prevent sintering of the catalyst metal by the support member, the heat resistance of the catalyst is also improved. In addition, it becomes possible to reduce the pressure loss.

The integral honeycomb structured body in which the catalyst is supported is allowed to function as a filter capable of collecting particulates in exhaust gases, and also to function as a catalyst converter for converting CO, HC, NOx and the like contained in exhaust gases.

Here, the integral honeycomb structured body of the present invention is allowed to function as a gas purifying (converting) device in the same manner as conventionally known DPFs (Diesel Particulate Filters) with a catalyst. Therefore, with respect to the case where the integral honeycomb structured body of the present invention is used as a catalyst supporting member, detailed description of the functions thereof is omitted.

Desirably, the integral honeycomb structured body is mainly made from a porous ceramic material, and examples of the material may include: nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite and silica; and the like. Moreover, the integral honeycomb structured body 20 may be made of two or more kinds of materials such as: a composite material of silicon and silicon carbide; or aluminum titanate.

With respect to the particle diameter of the ceramic material to be used upon manufacturing the integral honeycomb structured body, although not particularly limited, those materials that are less likely to shrink in the succeeding firing process are desirably used, and for example, those materials, prepared by mixing 100 parts by weight of powder having an average particle diameter of at least about 0.3 μm and at most about 50 μm with at least about 5 parts by weight and at most about 65 parts by weight of powder having an average particle diameter of at least about 0.1 μm and at most about 1.0 μm, are desirably used. By mixing ceramic powders having the above-mentioned particle diameters at the above-mentioned blending ratios, an integral honeycomb structured body made from porous ceramics can be manufactured.

Here, the plugs and the partition wall constituting the integral honeycomb structured body are desirably made from the same porous ceramic material. This arrangement makes it possible to increase the bonding strength between the two members, and by adjusting the porosity of the plugs in the same manner as that of the partition wall, it is possible to take the matching of the coefficient of thermal expansion of the partition wall and the coefficient of thermal expansion of the plugs. Thus, it becomes possible to prevent the occurrence of a gap between the plugs and the partition wall and the occurrence of a crack in the plugs or in the partition wall at a portion which contacts the plug due to a thermal stress that is exerted upon production as well as upon use.

Although not particularly limited, the lower limit of the porosity of the integral honeycomb structured body is desirably about 20%, and the upper limit thereof is desirably about 80%. When the porosity is at least about 20% and at most about 80%, the honeycomb structured body 20 is less susceptible to clogging and breakage of the honeycomb structured body due to degradation in the strength thereof can be prevented.

Here, the above-mentioned porosity can be measured through known methods, such as a mercury injection method, Archimedes method and a measuring method using a scanning electron microscope (SEM).

The lower limit of the average pore diameter of the integral honeycomb structured body is desirably about 1 μm, and the upper limit thereof is desirably about 100 μm. When the average pore diameter is at least about 1 μm and at most about 100 μm, it becomes difficult for particulates to clog the pore. Moreover, since particulates can surely be collected without passing through the pores, the integral honeycomb structured body can function as a filter.

The integral honeycomb structured body shown in FIGS. 1A to 1C has an approximately square pillar shape. However, the shape of the integral honeycomb structured body of the present invention is not particularly limited as long as it has a pillar shape, and, for example, pillar shapes having a shape such as a polygonal shape, a round shape, an elliptical shape and a sector shape, in the cross-section perpendicular to the longitudinal direction, may be used.

Moreover, in the integral honeycomb structured body of the present invention, the through holes are constituted by two types of through holes, that is, large-capacity through holes having a relatively large area on the cross section perpendicular to the longitudinal direction, with ends on the outlet side of the integral honeycomb structured body being sealed by plugs, and small-capacity through holes having a relatively small area on the cross section with ends on the inlet side of the integral honeycomb structured body being sealed by the plugs.

In the case where a filter for purifying (converting) exhaust gases that has collected particulates and increased the pressure loss is regenerated, the particulates are burned. In addition to carbon and the like that are burned and disappear, the particulates contain metal and the like that are burned to form oxides and left as ashes in the filter for purifying (converting) exhaust gases. Since the ashes normally remain at portions closer to the outlet of the filter for purifying (converting) exhaust gases, the through holes that serve as filters for purifying (converting) exhaust gases are filled with ashes starting from a portion closer to the outlet of the filter for purifying (converting) exhaust gases, and the capacity of the portion filled with the ashes gradually increases, while the capacity (area) of a portion capable of functioning as the filter for purifying (converting) exhaust gases gradually decreases. When the amount of accumulated ashes has become too much, the through holes are no longer allowed to function as the filter. Therefore, the resulting filter is taken out of the exhaust pipe and subjected to a reverse washing process to remove the ashes from the filter for purifying (converting) exhaust gases, or the filter for purifying (converting) exhaust gases is discarded.

In comparison with another integral honeycomb structured body in which the capacity of the inlet-side through holes and the capacity of the outlet-side through holes are the same, the integral honeycomb structured body of the present invention has a smaller ratio of reduction in the capacity (area) of the portion that functions as the exhaust gas purifying (converting) filter even after ashes accumulate, so that the pressure loss caused by the ashes becomes smaller.

Moreover, in the case where the particulates are burned to generate ashes, since the particulates tend to be burned on the catalyst on the partition wall A, the ashes tend to be accumulated while being adhered to the partition wall A. In this case, however, since the partition wall A is prepared as a partition wall that hardly causes an increase in pressure loss, the accumulation of ashes hardly causes an increase in pressure loss.

Here, the accumulated ashes on the partition wall A also have functions of preventing a temperature drop on the partition wall A and of securing a heat supplying function. On the other hand, ashes on the partition wall B, generated through the burning of particulates due to heat supplied from the partition wall A, are easily separated since only a small amount of catalyst is adhered to the surface of the partition wall B, and scattered toward the rear of the filter by passing exhaust gases and deposited thereon, so that it is possible to suppress an increase in pressure loss caused by the partition wall B.

Thus, the integral honeycomb structured body of the present invention makes it possible to prolong a period of time until the reverse washing and the like is required, and consequently to provide a longer service life as the filter for purifying (converting) exhaust gases. Consequently, it becomes possible to greatly cut maintenance costs required for reverse washing, exchanging members and the like.

In recent years, in the honeycomb structured body on which a catalyst is supported, a phenomenon in which ashes are deposited on the coating layer of the catalyst has been reported. Even in such a deposition state of ashes, the integral honeycomb structured body of the present invention, which has ashes deposited on the partition wall that is inherently less likely to contribute to an increase in pressure loss, can prevent an increase in pressure loss due to accumulation of ashes.

In the integral honeycomb structured body of the present invention having the structure as shown in FIGS. 1A to 1C, the shape of a cross section perpendicular to the longitudinal direction of the large-capacity through hole and/or small-capacity through hole is desirably formed into a polygonal shape. Even when the area of the partition wall in across-section perpendicular to the longitudinal direction of the honeycomb structured body is reduced to increase the aperture ratio, this polygonal shape makes it possible to achieve a honeycomb structured body that has an excellent durability and has a long service life. Among polygonal shapes, a polygon having four or more angles is desirably used and, more desirably, at least one of the angles is an obtuse angle. With this arrangement, it becomes possible to reduce a pressure loss caused by friction of exhaust gases upon passing through the through holes. Here, only the cross section of the large-capacity through holes may be a polygon, such as a quadrangle, a pentagon, a trapezoid and an octagon, or only the cross section of the small-capacity through holes may be the above-mentioned polygon, or both of them may be a polygon. In particular, the shape of across section perpendicular to the longitudinal direction of the large-capacity through holes is desirably an octagonal shape, with the shape of the cross section of the small-capacity through holes being desirably a quadrangle shape.

In the integral honeycomb structured body of the present invention, the ratio of the sum of areas on the cross section perpendicular to the longitudinal direction of the large-capacity through holes to the sum of areas on the cross section of the small-capacity through holes (total cross-sectional areas of large-capacity through holes/total cross-sectional areas of small-capacity through holes; hereinafter, also referred to as ratio of aperture ratios) desirably has a lower limit value of about 1.5, and the upper limit value of about 2.7. When the ratio of areas is less than about 1.5, the effects of preparing the large-capacity through holes and the small-capacity through holes are hardly obtained. On the other hand, the ratio of areas exceeding about 2.7 makes the capacity of the small-capacity through holes too small, and the pressure loss prior to collecting particulates may become too large.

In the integral honeycomb structured body of the present invention, the vicinity of each of corners on the cross section perpendicular to the longitudinal direction of the large-capacity through holes and/or the small-capacity through holes is desirably formed by a curved line. By forming the corner into a curved line, it becomes possible to prevent a stress from concentrating on the corner portions of the through holes and the subsequent occurrence of cracks, and also to reduce a pressure loss due to friction caused by exhaust gases passing through the through holes.

In the integral honeycomb structured body of the present invention, the distance between centers of gravity on a cross section perpendicular to the longitudinal direction of adjacent large-capacity through holes is desirably equal to the distance between centers of gravity on a cross section perpendicular to the longitudinal direction of adjacent small-capacity through holes. With this arrangement, upon regenerating, heat is uniformly dispersed so that the temperature distribution is easily made uniform. Thus, it becomes possible to provide a honeycomb structured body that has an excellent durability and is less likely to generate cracks due to a thermal stress even after repetitive uses for a long time.

In the present invention, the term "the distance between centers of gravity on a cross section perpendicular to the longitudinal direction of adjacent large-capacity through holes" represents the smallest distance between the center of gravity on a cross section perpendicular to the longitudinal direction of one large-capacity through hole and the center of gravity on the cross section of another large-capacity through hole. The term "the distance between centers of gravity on a cross section of adjacent small-capacity through holes" represents the smallest distance between the center of gravity on a cross section perpendicular to the longitudinal direction of one small-capacity through hole and the center of gravity on the cross section of another small-capacity through hole.

Moreover, in the integral honeycomb structured body 20 shown in FIGS. 1A and 1B, the large-capacity through holes 21a and the small-capacity through holes 21b are alternately arranged in the vertical direction as well as in the horizontal direction with a partition wall 23 interposed therebetween, and, in each of the directions, the center of gravity on a cross section perpendicular to the longitudinal direction of each of the large-capacity through holes 21a and the center of gravity on a cross section perpendicular to the longitudinal direction of each of the small-capacity through holes 21b are located on a straight line.

Therefore, "the distance between centers of gravity on a cross section perpendicular to the longitudinal direction of adjacent large-capacity through holes" and "the distance between centers of gravity on the cross section of adjacent small-capacity through holes" respectively refer to a distance between centers of gravity of large-capacity through holes 21a that are diagonally adjacent to each other and small-capacity through holes 21b that are diagonally adjacent to each other in a cross section perpendicular to the longitudinal direction of the integral honeycomb structured body 20 of the present invention.

Figure 2:
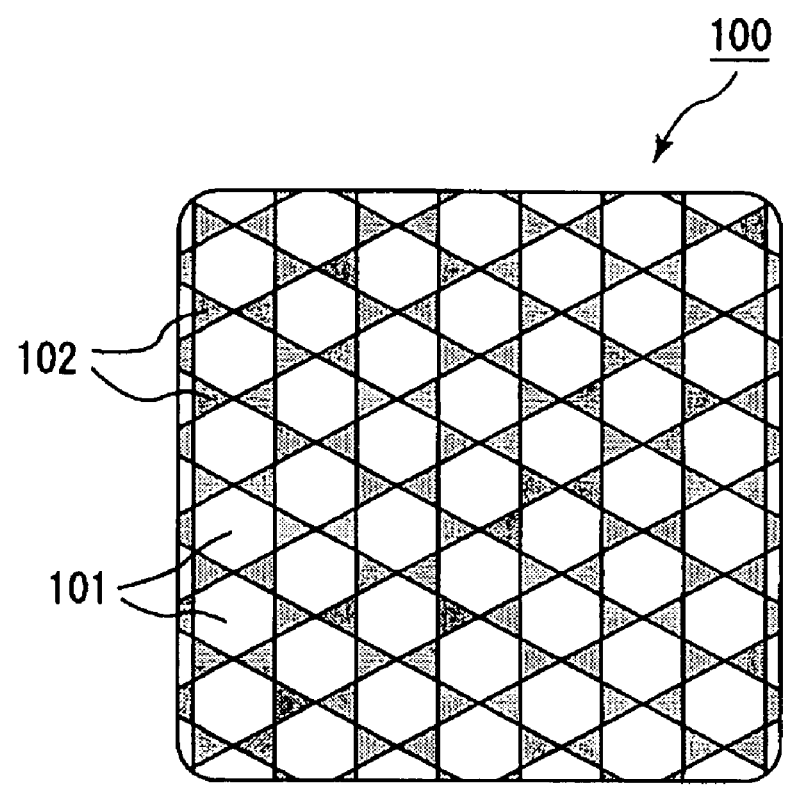
FIG. 2 is a cross-sectional view that schematically shows a cross section perpendicular to the longitudinal direction of a honeycomb structured body of the present invention in which the number of large-capacity through holes 101 and the number of small-capacity through holes 102 are approximately set to 1:2.

In the integral honeycomb structured body of the present invention, although not particularly limited, the number of the large-capacity through holes and the number of the small-capacity through holes are desirably set to substantially the same number. With this arrangement, it is possible to minimize the partition wall that hardly participates in filtration of exhaust gases, and consequently to prevent the pressure loss caused by friction due to gases passing through the inlet-side through holes and/or friction due to gases passing through the outlet-side through holes from rising over the necessary level. For example, in comparison with a honeycomb structured body 100 in which the number of the large-capacity through holes 101 and the number of the small-capacity through holes 102 are substantially set to about 1:2, as shown in FIG. 2, the structure in which the numbers of the respective through holes are substantially the same number makes it possible to reduce the pressure loss caused by friction due to gases passing through the outlet-side through holes, and consequently to reduce the pressure loss with respect to the honeycomb structured body as a whole.

The following description will discuss specific examples of structures of the large-capacity through holes and the small-capacity through holes on the cross section perpendicular to the longitudinal direction of the integral honeycomb structured body of the present invention.

Figure 3A:
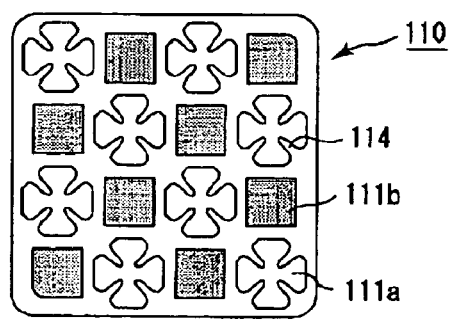
FIGS. 3A to 3D are cross-sectional views each of which schematically shows a cross section perpendicular to the longitudinal direction of an integral honeycomb structured body of the present invention.
Figure 3B:
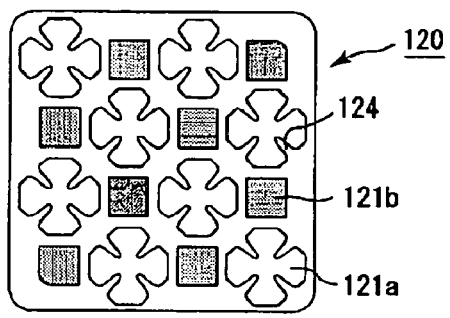
Figure 3C:
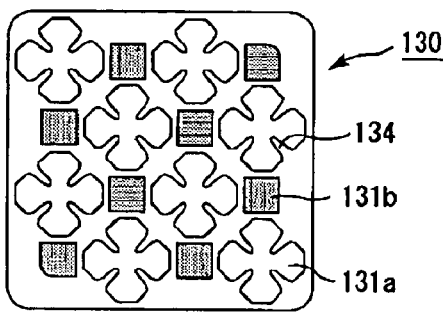
Figure 3D:
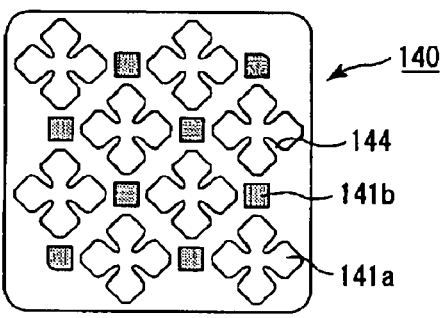
Figure 3E:
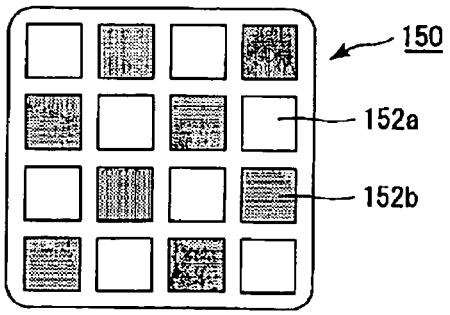
FIG. 3E is a cross-sectional view that schematically shows a cross section perpendicular to the longitudinal direction of a conventional integral honeycomb structured body.

FIGS. 3A to 3D and FIGS. 4A to 4F are cross-sectional views each of which schematically shows a cross section perpendicular to the longitudinal direction in the integral honeycomb structured body of the present invention; and FIG. 3E is a cross-sectional view that schematically shows a cross section perpendicular to the longitudinal direction in a conventional integral honeycomb structured body.

In the integral honeycomb structured body 110 shown in FIG. 3A, the ratio of aperture ratios is about 1.55; in the integral honeycomb structured body 120 shown in FIG. 3B, the ratio is about 2.54; in the integral honeycomb structured body 130 shown in FIG. 3C, the ratio is about 4.45; and in the integral honeycomb structured body 140 shown in FIG. 3D, the ratio is about 6.00. Moreover, in FIGS. 4A, 4C and 4E, all the ratios of aperture ratios are about 4.45, and in FIGS. 4B, 4D and 4F, all the ratios of aperture ratios are about 6.00.

Here, in the case where the ratio of aperture ratios is great as indicated by the integral honeycomb structured body 140 of FIG. 3D, the initial pressure loss tends to become too high since the capacity of the small-capacity through holes 141b forming the group of outlet-side through holes becomes too small.

In the integral honeycomb structured bodies 110, 120, 130, 140 shown in FIGS. 3A to 3D, protruded portions 114, 124, 134, 144 are formed on the partition walls that respectively separate the large-capacity through holes 111a, 121a, 131a, 141a from one another. The cross-sectional shape of each of the large-capacity through holes 111a, 121a, 131a, 141a, from which each of the protruded portions 114, 124, 134, 144 is omitted, is an octagon. The cross-sectional shape of each of the small-capacity through holes 111b, 121b, 131b, 141b is a quadrangle (square). The large-capacity through holes 111a, 121a, 131a, 141a and the small-capacity through holes 111b, 121b, 131b, 141b are alternately arranged. Here, in the integral honeycomb structured bodies shown in FIGS. 3A to 3D, by changing the cross-sectional area of the small-capacity through holes and also slightly changing the cross-sectional shape of the large-capacity through holes, it is possible to easily vary the ratio of aperture ratios arbitrarily. In the same manner, with respect to the integral honeycomb structured body shown in FIG. 4, it is also possible to easily vary the ratio of aperture ratios arbitrarily. Moreover, as shown in FIGS. 3A to 3D, it is desirable to provide chamfered portions on corner portions on the periphery of the integral honeycomb structured body of the present invention.

Here, in an integral honeycomb structured body 150 shown in FIG. 3E, both of the cross-sectional shapes of inlet-side through holes 152a and outlet-side through holes 152b are quadrangle shapes, and alternately arranged respectively.

Figure 4A:
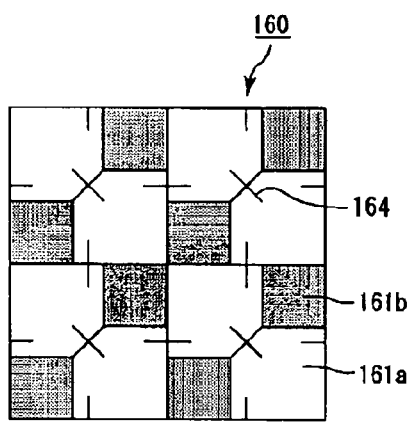
FIGS. 4A to 4F are cross-sectional views each of which schematically shows one portion of a cross section perpendicular to the longitudinal direction of an integral honeycomb structured body of the present invention.
Figure 4B:
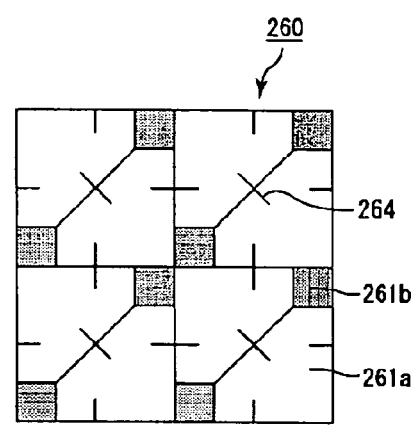
Figure 4C:
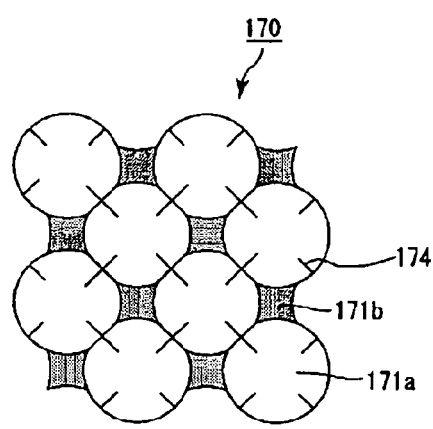
Figure 4D:
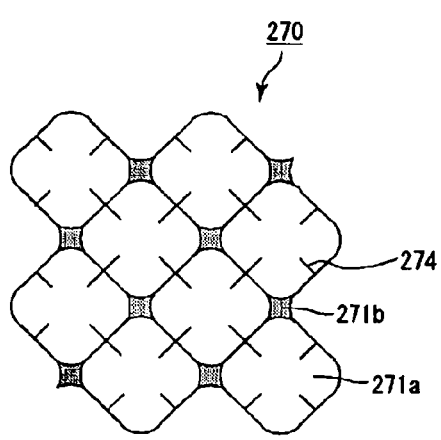

In integral honeycomb structured bodies 160, 260 shown in FIGS. 4A and 4B, protruded portions 164, 264 are formed on the partition walls that respectively separate the large-capacity through holes 161a, 261a. The cross-sectional shape of each of the large-capacity through holes 161a, 261a, from which each of the protruded portions 164, 264 is omitted, is a pentagon, and in this shape, three angles thereof are set to approximately right angles. The cross-sectional shape of each of the small-capacity through holes 161b, 261b is a quadrangle and the small-capacity through holes are allowed to respectively occupy portions of a larger quadrangle that diagonally face each other. In integral honeycomb structured bodies 170, 270 shown in FIGS. 4C and 4D, protruded portions 174, 274 are formed on the partition walls that respectively separate the large-capacity through holes 171a, 271a. Here, the cross-sectional shapes of the integral honeycomb structured bodies 170, 270 shown in FIGS. 4C and 4D are modified shapes of the cross-sectional shapes shown in FIGS. 3A to 3D, and the shape is formed by expanding a partition wall commonly possessed by each of the large-capacity through holes 171a, 271a and each of the small-capacity through holes 171b, 271b toward the small-capacity through hole side with a predetermined curvature. This curvature is optionally set, and the curved line forming the partition wall may correspond to, for example, a ¼ of a circle. In this case, the above-mentioned ratio of aperture ratios is 3.66. Therefore, in the integral honeycomb structured bodies 170, 270, shown in FIGS. 4C and 4D, the area of the cross section of each of the small-capacity through holes 171b, 271b is made further smaller compared to the case in which the curved line forming the partition wall corresponds to a ¼ of a circle. In integral honeycomb structured bodies 180, 280 shown in FIGS. 4E and 4F, protruded portions 184, 284 are formed on the partition walls that respectively separate the large-capacity through holes 181a, 281a. The cross-sectional shape of each of the large-capacity through holes 181a, 281a, from which each of the protruded portions 184, 284 is omitted, as well as the cross-sectional shape of each of the small-capacity through holes 181b, 281b, is a quadrangle (rectangle). When two of the large-capacity through holes and two of the small-capacity through holes are combined together, an approximately square shape is formed.

Figure 5:
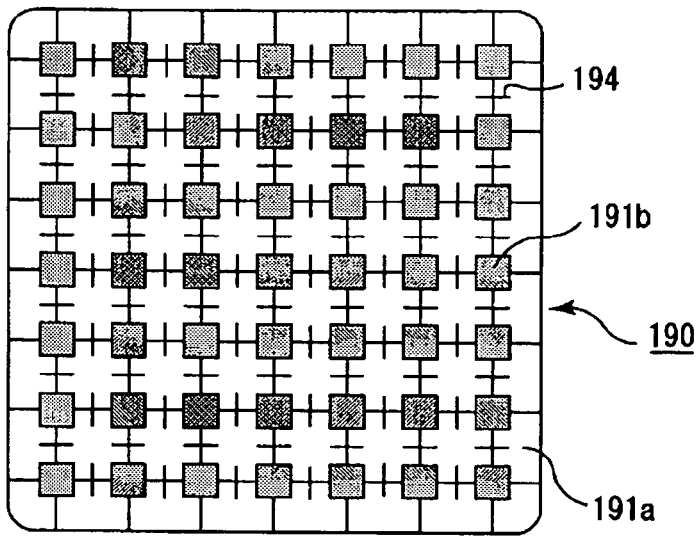
FIG. 5 is a cross-sectional view that schematically shows one example of a cross section perpendicular to the longitudinal direction of an integral honeycomb structured body of the present invention.

Other specific examples of structures of the large-capacity through holes and the small-capacity through holes in the cross section perpendicular to the longitudinal direction of the integral honeycomb structured body of the present invention may include an integral honeycomb structured body 190 as shown in FIG. 5 having large-capacity through holes 191a, small-capacity through holes 191b and protruded portions 194 and the like.

Only a single integral honeycomb structured body of the present invention may be used as an integral-type filter. More desirably, a plurality of them may be combined together through a sealing material layer, and used as an aggregated-type filer. The aggregated-type filter makes it possible to reduce a thermal stress by the sealing material layer to improve the heat resistance of the filter. Further, the size and the like of the filter can be freely adjusted by increasing or decreasing the number of the integral honeycomb structured bodies.

Here, both of the integral-type filter and the aggregated-type filter have the same functions.

In the integral-type filter formed by the integral honeycomb structured body of the present invention, an oxide ceramic material such as cordierite is normally used as its material. This material makes it possible to cut manufacturing costs, and since this material has a comparatively small coefficient of thermal expansion, it is possible to make the filter less likely to receive damage due to a thermal stress that is exerted during production as well as during use.

In the integral-type filter formed by the integral honeycomb structured body of the present invention, although not shown in FIGS. 1A to 1C, a sealing material layer, made from a material that hardly lets gases pass through in comparison with the integral honeycomb structured body of the present invention, is desirably formed on the peripheral face thereof in the same manner as the aggregated honeycomb structured body of the present invention which will be described later. In the case where the sealing material layer is formed on the peripheral face, the integral honeycomb structured body of the present invention is compressed by the sealing material layer, so that it is possible to increase the strength, and also to prevent isolation of ceramic particles due to occurrence of cracks.

In accordance with the integral honeycomb structured body of the present invention, since the selective catalyst supporting portion is formed on the partition wall that separates the adjacent through holes constituting the group of through holes, a partition wall on which a large amount of catalyst is supported (hereinafter, referred to as partition wall A) and the other partition wall (hereinafter, referred to as partition wall B) are allowed to exert different functions. In other words, the partition wall A has a function of supplying the filter with heat generated through oxidizing reactions of HC, CO and the like in exhaust gases by the catalyst to increase the temperature (heat supplying function). The partition wall B has a function of letting exhaust gases pass through during both of the particulate accumulating process and the particulate burning process so as to prevent the pressure loss of the filter from increasing (suppressing function of pressure loss increase). Here, since the partition wall A is a partition wall that hardly lets exhaust gases pass through inherently, this partition wall is less likely to contribute to an increase in the pressure loss even when a catalyst that needs to be supported in a large amount, such as NOx absorbing catalyst, is supported. Moreover, when the particulates are burned to generate ashes, the ashes are accumulated on the partition wall A while being adhered thereto since the partition wall A tends to allow the burning of the particulates on the catalyst. However, since the partition wall A is a partition wall that hardly causes an increase in the pressure loss as described earlier, the pressure loss hardly occurs even when the ashes are deposited thereon.

Moreover, the ashes deposited on the partition wall A also prevent a temperature drop on the partition wall A to maintain the heat supplying function. On the other hand, on the partition wall B, the ashes, generated through the burning of particulates due to heat supplied from the partition wall A, are easily separated since the amount of the catalyst adhered to the surface of the partition wall B is small, and easily scattered toward the rear of the filter by the passing exhaust gases and deposited therein. Thus, it is possible to suppress an increase in the pressure loss due to the partition wall B.

Furthermore, since an increased amount of catalyst is supported, the purifying (converting) function for exhaust gases is improved in addition to the above-mentioned functions, and depending on the amount of catalyst, it becomes possible to burn and remove the particulates without a high-temperature regenerating process, and consequently to suppress an increase in the pressure loss upon collecting particulates. Moreover, since a partition wall which separates inlet-side through holes from each other hardly allows exhaust gases to flow therein, it gives only little influences to the pressure loss, even when its shape, the amount of the supported catalyst and the like are changed.

When the selective catalyst supporting portion is prepared as a protruded portion and/or a recessed portion formed on the partition wall that separates adjacent through holes constituting the group of large-capacity through holes, a catalyst is easily supported on the selective catalyst supporting portion selectively. In the case where the protruded portion, formed at the selective catalyst supporting portion, is designed to have a height of at least about 0.02 time and at most about 6 times the thickness of the partition wall that separates adjacent through holes constituting the group of large-capacity through holes, or in the case where the recessed portion, formed at the selective catalyst supporting portion, is designed to have a depth of at least about 0.02 time and at most about 0.4 time the thickness of the partition wall that separates adjacent through holes constituting the group of large-capacity through holes, the catalyst is easily supported on the selective catalyst supporting portion selectively, thereby making it possible to prevent damages to the protruded portion due to pressure of exhaust gases and the like and the subsequent damages to the partition wall.

In the integral honeycomb structured body of the present invention, if the cross-sectional shape perpendicular to the longitudinal direction of the through holes that constitute the group of large-capacity through holes and/or the through holes that constitute the group of small-capacity through holes is a polygonal shape, even when the area of the partition wall on the cross section perpendicular to the longitudinal direction is reduced to increase the aperture ratio in order to reduce the pressure loss, it becomes possible to achieve a honeycomb structured body having superior durability and a long service life. Moreover, in the case where the cross-sectional shape perpendicular to the longitudinal direction of the through holes that constitute the group of large-capacity through holes is an octagonal shape while the cross-sectional shape perpendicular to the longitudinal direction of the through holes that constitute the group of small-capacity through holes is a quadrangular shape, it becomes possible to achieve a honeycomb structured body having further superior durability and a longer service life.

Here, in the present invention, the aperture ratio refers to a ratio of the area of the group of the large-capacity through holes to the total area of the end faces on the inlet side of the honeycomb structured body, and is represented by, for example, percentage (%). In this case, it is defined that the portion occupied by the sealing material layer is not included in the total area of the end faces.

In the integral honeycomb structured body of the present invention, when a ratio of the sum of areas on a cross section perpendicular to the longitudinal direction of the through holes that constitute the group of large-capacity through holes to the sum of areas on the cross section perpendicular to the longitudinal direction of the through holes that constitute the group of small-capacity through holes is in the range of 1.5 to 2.7, it is possible to suppress an increase in pressure loss upon collecting particulates by increasing the aperture ratio on the inlet side relatively, and also to prevent the pressure loss prior to the particulate collecting process from becoming too high.

In the integral honeycomb structured body of the present invention, when, on the cross section perpendicular to the longitudinal direction, at least one of angles formed by crossing of the partition wall that separates adjacent through holes constituting the group of large-capacity through holes and the partition wall that separates adjacent through holes, one of which constituting the group of large-capacity through holes and the other of which constituting the group of small-capacity through holes, is an obtuse angle, it becomes possible to reduce the pressure loss.

In the integral honeycomb structured body of the present invention, if, on the cross section perpendicular to the longitudinal direction, the vicinity of each of corners of the through hole constituting the group of the large-capacity through holes and/or the through hole constituting the group of the small-capacity through holes is formed by a curved line, it becomes possible to prevent stresses from concentrating on each corner of the through hole, and consequently to prevent occurrence of cracks as well as to reduce the pressure loss.

In the integral honeycomb structured body of the present invention, if the distance between centers of gravity on a cross section perpendicular to the longitudinal direction of adjacent through holes constituting the group of the large-capacity through holes is equal to the distance between centers of gravity on a cross section perpendicular to the longitudinal direction of adjacent through holes constituting the group of the small-capacity through holes, upon regenerating, heat is easily dispersed uniformly to make a uniform temperature distribution, so that it becomes possible to provide a honeycomb structured body that is superior in durability and less likely to generate cracks caused by thermal stresses even after repetitive uses for a long time.

The aggregated honeycomb structured body of the present invention comprises:

a honeycomb block formed by combining a plurality of the integral honeycomb structured bodies of the present invention together through a sealing material layer; and a sealing material layer which is formed on the peripheral face of the honeycomb block, wherein the sealing material layer is made from a material that hardly lets gases pass through in comparison with the integral honeycomb structured body of the present invention, and functions as an aggregated-type filter.

Figure 6:
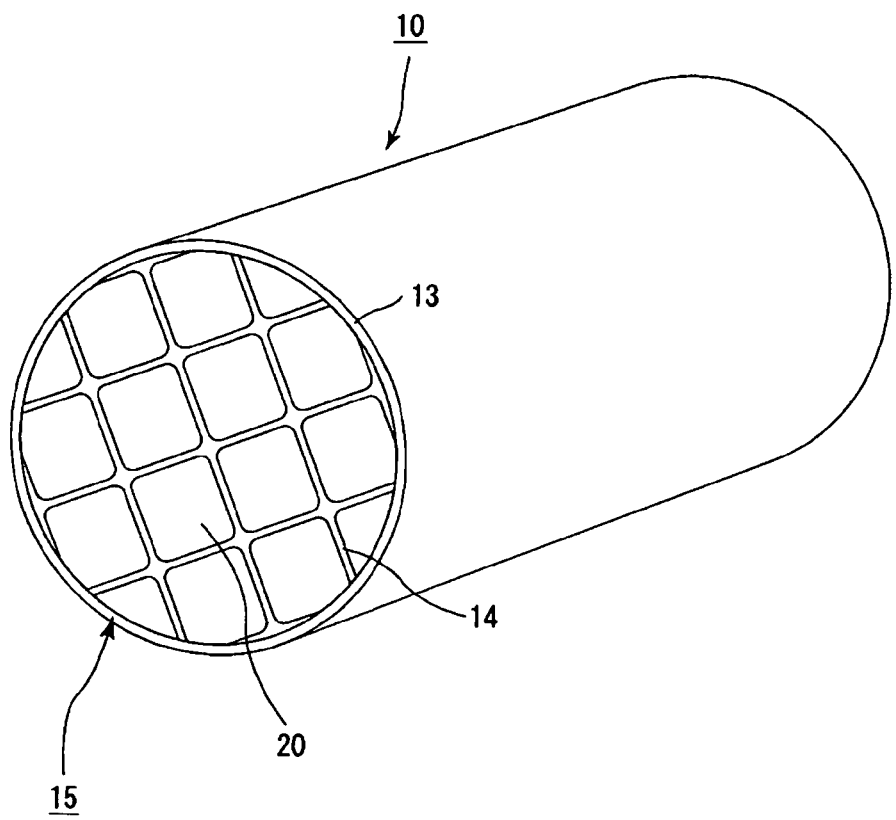
FIG. 6 is a perspective view that schematically shows one example of an aggregated honeycomb structured body of the present invention.

FIG. 6 is a perspective view that schematically shows one example of the aggregated honeycomb structured body of the present invention. In the aggregated honeycomb structured body shown in FIG. 6, a number of through holes are constituted by a group of large-capacity through holes being sealed at one of the end portions of the honeycomb structured body so that the sum of areas on the cross section perpendicular to the longitudinal direction is made relatively greater, and a group of small-capacity through holes being sealed at the other end portion of the honeycomb structured body so that the some of areas on the cross section is made relatively smaller.

As shown in FIG. 6, the aggregated honeycomb structured body 10, which is used as a filter for purifying (converting) exhaust gases, has a structure in which a plurality of the integral honeycomb structured bodies 20 are combined together through a sealing material layer 14 to form a honeycomb block 15, with a sealing material layer 13 for preventing leakage of exhaust gases formed on the periphery of the honeycomb block 15. Here, the sealing material layer 13 is made from a material that hardly lets gases pass through in comparison with the integral honeycomb structured body 20.

Here, in the aggregated honeycomb structured body 10, silicon carbide, which is superior in thermal conductivity, heat resistance, mechanical properties, chemical resistance and the like, is desirably used as a material for constituting the integral honeycomb structured body 20.

In the aggregated honeycomb structured body 10, the sealing material layer 14, which is formed between the integral ceramic structured bodies 20, desirably serves as an adhesive that bonds a plurality of the integral ceramic structured bodies 20 to one another. The sealing material layer 13, on the other hand, which is formed on the peripheral face of the honeycomb block 15, serves as a sealing member that prevents exhaust gases that pass through the through holes from leaking from the peripheral face of the honeycomb block 15, when the aggregated honeycomb structured body 10 is placed in an exhaust passage in an internal combustion engine.

Here, in the aggregated honeycomb structured body 10, the sealing material layer 13 and the sealing material layer 14 may be made from the same material, or may be made from different materials. In the case where the sealing material layer 13 and the sealing material layer 14 are made from the same material, the blending ratio of the materials may be the same or different from each other.

The sealing material layer 14 may be made from a dense material or may be made from a porous material so as to allow exhaust gases to flow therein. However, the sealing material layer 13 is desirably made from a dense material. This is because the sealing material layer 13 is formed so as to prevent leakage of exhaust gases from the peripheral face of the ceramic block 15 when the aggregated honeycomb structured body 10 is placed in an exhaust passage of an internal combustion engine.

With respect to the material for forming the sealing material layer 13 and the sealing material layer 14, examples thereof are not particularly limited and may include a material comprising inorganic fibers and/or inorganic particles in addition to an inorganic binder and an organic binder.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof may include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof may include ceramic fibers such as silica-alumina, mullite, alumina, silica and the like. Each of these may be used alone or two or more kinds of these may be used in combination. Among the inorganic fibers, silica-alumina fibers are more desirably used.

With respect to the inorganic particles, examples thereof may include carbides, nitrides and the like, and specific examples may include inorganic powder, whiskers and the like made from silicon carbide, silicon nitride, boron nitride and the like. Each of these may be used alone, or two or more kinds of these may be used in combination. Among the inorganic particles, silicon carbide having an excellent thermal conductivity is desirably used.

In the case where the integral honeycomb structured body of the present invention, as it is, is used as a filter for purifying (converting) exhaust gases as described above, the sealing material layer that is the same as that of the aggregated honeycomb structured body of the present invention may be formed on the peripheral face of the integral honeycomb structured body of the present invention.

The aggregated honeycomb structured body 10 shown in FIG. 6 has a cylindrical shape. However, the shape of the aggregated honeycomb structured body of the present invention is not particularly limited as long as it is a pillar-shaped body, and may be, for example, a pillar-shape with a cross-sectional shape perpendicular to the longitudinal direction being a polygonal shape, an elliptical shape and the like.

The aggregated honeycomb structured body of the present invention may be manufactured by: processes in which, after a plurality of integral honeycomb structured bodies of the present invention have been combined together, the peripheral portion thereof is machined so as to form the cross section perpendicular to the longitudinal direction into a polygonal shape, a round shape, an elliptical shape or the like; or processes in which, after the cross section of the integral honeycomb structured bodies of the present invention have been preliminarily machined, the resulting structured bodies are combined together by using an adhesive so as to form the cross section perpendicular to the longitudinal direction into a polygonal shape, a round shape, an elliptical shape or the like. For example, four pillar-shaped integral honeycomb structured bodies of the present invention, each having a sector shape on its cross section perpendicular to the longitudinal direction that is one of four equally divided portions of a circle, may be combined together to manufacture a cylindrical aggregated honeycomb structured body of the present invention.

In accordance with the aggregated honeycomb structured body of the present invention, the honeycomb structured body has a structure in which a plurality of the integral honeycomb structured bodies of the present invention is combined together through a sealing material layer. Therefore, it is possible to improve the heat resistance by reducing thermal stresses by using the sealing material layer, and also to freely adjust the size by increasing or reducing the number of the integral honeycomb structured bodies of the present invention.

Next, the following description will discuss one example of a manufacturing method for the above-mentioned honeycomb structured body of the present invention.

In the case where the honeycomb structured body of the present invention is an integral-type filter in which the entire structure is made of a single sintered body, first, an extrusion-molding process is carried out by using the material paste mainly composed of the above-mentioned ceramics so that a ceramic formed body having approximately the same shape as the integral honeycomb structured body of the present invention with the selective catalyst supporting portions formed thereon is manufactured. In this case, for example, metal molds that are used for extrusion-molding having two types of through holes, that is, large-capacity through holes and small-capacity through holes, are selected in accordance with the densities of the through holes.

Here, the shape of the selective catalyst supporting portions can be adjusted by changing the shape of the opening section of a die to be used for the above-mentioned extrusion-molding.

Although the material paste is not particularly limited, material paste which sets the porosity of the integral honeycomb structured body after the manufacturing process is desirably at least about 20% and at most about 80%, and, for example, a material paste prepared by adding a binder, a dispersant solution and the like to powder made from the above-mentioned ceramics may be used.

The above-mentioned binder is not particularly limited, and examples thereof may include methylcellulose, carboxymethyl cellulose, hydroxyethyl cellulose, polyethylene glycol, phenol resins, epoxy resins and the like.

Normally, the blend ratio of the above-mentioned binder is desirably at least about 1 part by weight and at most about 10 parts by weight to 100 parts by weight of ceramic powder.

The above-mentioned dispersant solution is not particularly limited, and, for example, an organic solvent such as benzene, alcohol such as methanol, water and the like may be used.

An appropriate amount of the above-mentioned dispersant solution is blended so that the viscosity of the material paste is set in a predetermined range.

These ceramic powder, binder and dispersant solution are mixed by an attritor or the like, and sufficiently kneaded by a kneader or the like, and then extrusion-molded.

Moreover, a molding auxiliary may be added to the above-mentioned material paste, if necessary.

The molding auxiliary is not particularly limited, and examples thereof may include ethylene glycol, dextrin, fatty acid soap, polyalcohol and the like.

Furthermore, a pore-forming agent, such as balloons that are fine hollow spheres composed of oxide-based ceramics, spherical acrylic particles or graphite, may be added to the above-mentioned material paste, if necessary.

The above-mentioned balloons are not particularly limited and, for example, alumina balloons, glass micro-balloons, shirasu balloons, fly ash balloons (FA balloons), mullite balloons and the like may be used. Among these, fly ash balloons are more desirably used.

Next, the above-mentioned ceramic formed body is dried by using a micro-wave dryer, a hot-air dryer, a dielectric dryer, a decompression dryer, a vacuum dryer, a freeze dryer or the like to form a ceramic dried body. Next, a predetermined amount of plug paste, which forms plugs, is injected into ends on the outlet side of the large-capacity through holes and ends on the inlet side of the small-capacity through holes so as to seal the through holes.

Although the above-mentioned plug paste is not particularly limited, the plug paste which sets the porosity of a plug manufactured through the following processes is desirably at least about 20% and at most about 80%, and for example, the same material paste as described above may be used. However, those pastes, prepared by adding a lubricant, a solvent, a dispersant, a binder and the like to ceramic powder used as the above-mentioned material paste, are desirably used. With this arrangement, it becomes possible to prevent ceramics particles and the like in the plug paste from settling in the middle of the sealing process.

Next, the ceramic dried body filled with the plug paste is subjected to degreasing and firing processes under predetermined conditions.

Here, with respect to the degreasing and firing conditions and the like of the ceramic dried body, it is possible to apply conditions that have been conventionally used for manufacturing a filter made from porous ceramics.

Next, an alumina film having a high specific surface area is formed on the surface of the ceramic fired body obtained from the firing process, and a catalyst such as platinum is applied onto the surface of the alumina film so that an integral honeycomb structured body of the present invention, which is made from a porous ceramic material on the surface of which a catalyst is supported, and formed by a single sintered body as a whole, is manufactured.

With respect to the method for forming the alumina film on the surface of the ceramic fired body, examples thereof may include: a method in which the ceramic fired body is impregnated with a solution of a metal compound containing aluminum such as $Al(NO_3)_3$ and then heated; a method in which the ceramic fired body is impregnated with a slurry solution containing γ-alumina powder, which has a high surface area and is obtained by pulverizing γ-alumina, and then heated; and the like.

With respect to the method for applying a co-catalyst and the like to the alumina film, examples thereof may include a method in which the ceramic fired body is impregnated with a solution of a metal compound containing a rare-earth element, such as $Ce(NO_3)_3$, and then heated, and the like.

With respect to the method for applying a catalyst to the alumina film, examples thereof may include a method in which the ceramic fired body is impregnated with a solution of diamine dinitro platinum nitric acid ([Pt $(NH_3)_2(NO_2)_2$] $HNO_3$) and the like and then heated, and the like.

Moreover, in the case where the honeycomb structured body of the present invention is an aggregated honeycomb structured body 10 which is constituted by a plurality of integral honeycomb structured bodies 20 combined with one another through a sealing material layer 14 as shown in FIG. 6, an adhesive paste to form a sealing material layer 14 is applied with an even thickness, and other integral honeycomb structured bodies 20 coated with the adhesive paste are sequentially laminated thereon. A laminated body of a square-pillar shaped integral honeycomb structured bodies 20 having a predetermined size is thus manufactured.

Here, with respect to the material for forming the adhesive paste, the detailed description is omitted, since the explanation thereof has already been given.

Next, the laminated body of the integral honeycomb structured bodies 20 is heated so that the adhesive paste layer is dried and solidified to form the sealing material layer 14, and, by using a diamond cutter or the like, the peripheral portion thereof is then cut into a shape as shown in FIG. 6 so that a honeycomb block 15 is manufactured.

Then, a sealing material layer 13 is formed on the peripheral portion of the honeycomb block 15 by using the adhesive paste so that the aggregated-type filter 10 of the present invention, constituted by a plurality of integral honeycomb structured bodies 20 combined together through a sealing material layer 14, is manufactured.

Here, when manufacturing the aggregated filter 10 of the present invention, the formation of the alumina film, the application of the catalyst and the like may be carried out after the formation of the honeycomb block 15, without carrying out these processes after the formation of the ceramic fired body.

Although not particularly limited, the honeycomb structured body of the present invention is desirably applied to an exhaust gas purifying (converting) device for use in vehicles.

Figure 7:
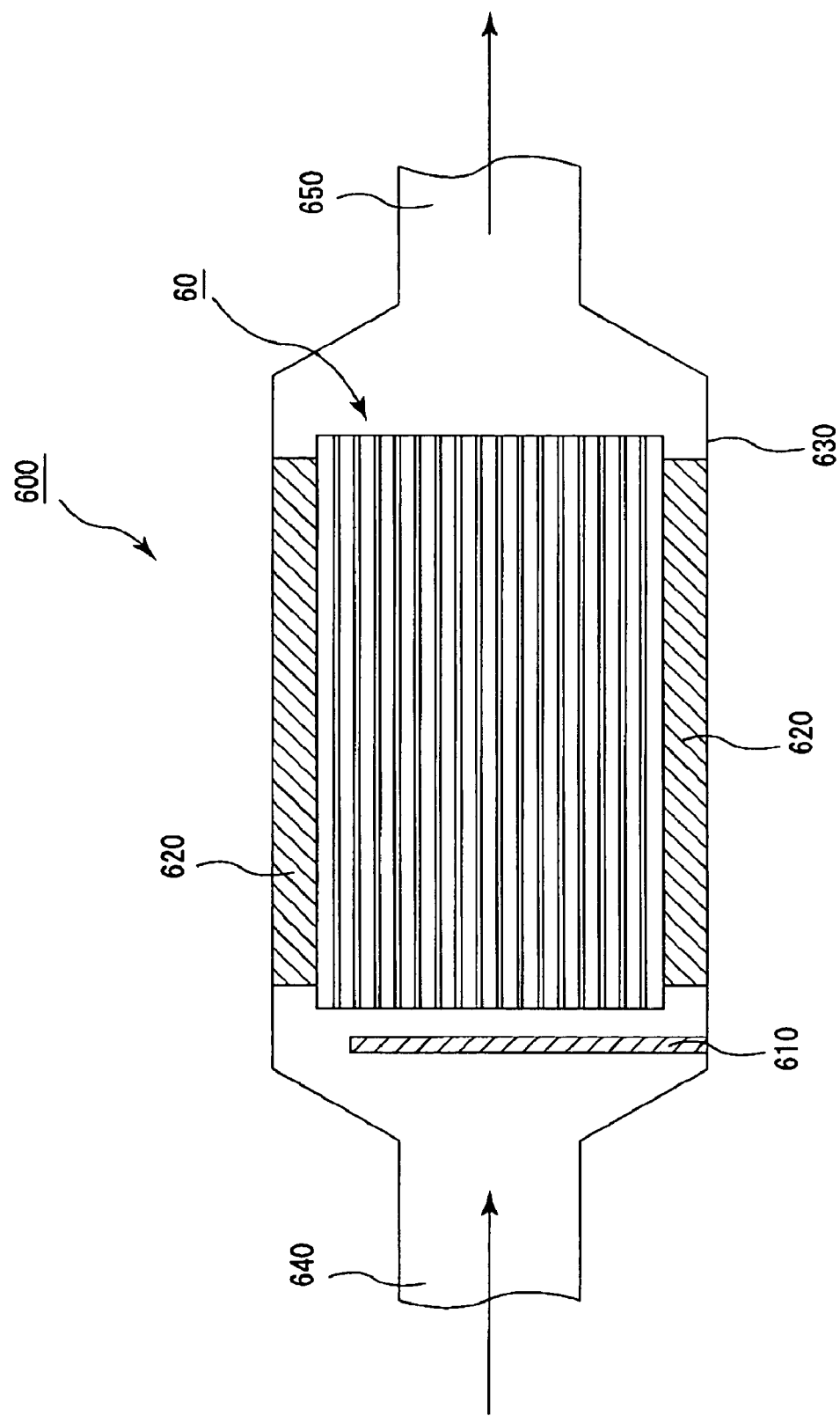
FIG. 7 is a cross-sectional view that schematically shows one example of an exhaust gas purifying (converting) device for a vehicle in which the honeycomb structured body of the present invention is placed.

FIG. 7 is a cross-sectional view that schematically shows one example of an exhaust gas purifying (converting) device of a vehicle in which the honeycomb structured body of the present invention is installed.

As shown in FIG. 7, an exhaust gas purifying (converting) device 600 is mainly constituted by a honeycomb structured body 60, a casing 630 that covers the external portion of the honeycomb structured body 60, a holding sealing material 620 that is placed between the honeycomb structured body 60 and the casing 630 and a heating means 610 placed at the exhaust gas inlet side of the honeycomb structured body 60. An introducing pipe 640, which is connected to an internal combustion engine such as an engine, is connected to one end of the casing 630 on the exhaust gas inlet side, and an exhaust pipe 650, which is connected to the outside, is connected to the other end of the casing 630. In FIG. 7, arrows show flows of exhaust gases.

Moreover, in FIG. 7, the honeycomb structured body 60 may be the integral honeycomb structured bodies 20,30 shown in FIGS. 1A to 1C or the aggregated honeycomb structured body 10 shown in FIG. 6.

In the exhaust gas purifying (converting) device 600 having the above-mentioned constitution, exhaust gases, discharged from the internal combustion engine such as an engine, are directed into the casing 630 through the introducing pipe 640, and allowed to flow into the honeycomb structured body 60 through the large-capacity through holes 21a and to pass through the portions of the partition wall 23. Then, the exhaust gases are purified, with particulates thereof being collected in the partition wall 23, and are then discharged to the outside of the honeycomb structured body 60 from the small-capacity through holes 21b, and discharged outside through the exhaust pipe 650.

In the exhaust gas purifying (converting) device 600, after a large quantity of particulates accumulate on the partition wall of the honeycomb structured body 60 to cause an increase in pressure loss, the honeycomb structured body 60 is subjected to a regenerating process.

In the regenerating process, gases, heated by using a heating means 610, are allowed to flow into the through holes of the honeycomb structured body 60, so that the honeycomb structured body 60 is heated to burn and eliminate the particulates deposited on the partition wall. Moreover, the particulates may be burned and eliminated by using a post-injection system. In addition to these methods, a filter to which an oxide catalyst is applied may be placed at a portion of the introducing pipe 640 in front of the casing 630, or a filter to which an oxide catalyst is applied may be placed on the exhaust gas inlet side of the heating means 610 inside the casing 630.

In the honeycomb structured body of the present invention, when the honeycomb structured body is used for an exhaust gas purifying (converting) device for use in a vehicle, it is possible to improve the purifying (converting) performance for exhaust gases, and also to suppress an increase in pressure loss upon collecting particulates to prolong the period up to the regenerating process, to improve the heat resistance and also to freely adjust the size and the like.

EXAMPLES

Referring to the figures, the following description will discuss the present invention in detail by means of examples. However, the present invention is not intended to be limited by these examples.

Example 1

(1) Powder of α-type silicon carbide having an average particle diameter of 10 μm (60% by weight) and powder of β-type silicon carbide having an average particle diameter of 0.5 μm (40% by weight) were wet-mixed, and to 100 parts by weight of the resulting mixture were added and kneaded 5 parts by weight of an organic binder (methyl cellulose) and 10 parts by weight of water to obtain a mixed composition. Next, after adding a slight amount of a plasticizer and a lubricant and further kneading, the resulting mixture was extrusion-molded, so that a raw molded product having a cross-sectional shape that was approximately the same cross-sectional shape shown in FIG. 3A, with an aperture ratio on the inlet side of 37.97% and a ratio of aperture ratios of 1.55, was manufactured. The thickness of the partition wall separating adjacent large-capacity through hole and small-capacity through hole was 0.3 mm, the thickness of the partition wall separating adjacent large-capacity through holes from each other was 0.6 mm, and the height of each protruded portion formed on the partition wall separating adjacent large-capacity through holes from each other was 0.1 mm.

Next, after drying the above-mentioned raw molded product by using a microwave drier or the like to form a ceramic dried body, predetermined through holes were filled with a plug paste having the same composition as the raw molded product.

After having been again dried by using a drier, the resulting product was degreased at 400° C., and fired at 2200° C. in a normal-pressure argon atmosphere for 3 hours to manufacture an integral honeycomb structured body, which was a silicon carbide sintered body, and had a porosity of 42%, an average pore diameter of 9 μm, a size of 34.3 mm×34.3 mm×150 mm and the number of through holes 21 of 28 pcs/cm² (large-capacity through holes: 14 pcs/cm², small-capacity through holes: 14 pcs/cm²).

Here, in the integral honeycomb structured body, only the large-capacity through holes were sealed by plugs on the end face on the outlet side, and only the small-capacity through holes were sealed with the plugs on the end face on the inlet side.

(2) Next, an aggregated honeycomb structured body was manufactured by using the resulting integral honeycomb structured bodies.

By using a heat resistant sealing material paste containing 30% by weight of alumina fibers having a fiber length of 0.2 mm, 21% by weight of silicon carbide particles having an average particle diameter of 0.6 μm, 15% by weight of silica sol, 5.6% by weight of carboxymethyl cellulose and 28.4% by weight of water, a large number of the integral honeycomb structured bodies 20 were combined together, and then cut by using a diamond cutter to form a cylindrical ceramic block having a diameter of 144 mm and a length of 150 mm.

In this case, the thickness of the sealing material layer 14 used for combining the integral honeycomb structured bodies 20 was adjusted to 1.0 mm.

(3) Next, ceramic fibers made from alumina silicate (shot content: 3%, fiber length: 0.1 to 100 mm) (23.3% by weight) as inorganic fibers, silicon carbide powder having an average particle diameter of 0.3 μm (30.2% by weight) as inorganic particles, silica sol ($SiO_2$ content in the sol: 30% by weight) (7% by weight) as an inorganic binder, carboxymethyl cellulose (0.5% by weight) as an organic binder, and water (39% by weight) were mixed and kneaded to prepare a sealing material paste.

Next, a sealing material paste layer having a thickness of 1.0 mm was formed on the peripheral face of the ceramic block by using the above-mentioned sealing material paste. Further, this sealing material paste layer was dried at 120° C., so that an aggregated honeycomb structured body functioning as a cylindrical honeycomb filter for purifying (converting) exhaust gases was manufactured.

(4) Next, γ-alumina was mixed with water and a nitric acid solution serving as a dispersant, and further ground by a ball mill at 90 $min^{-1}$ for 24 hours to prepare alumina slurry having a particle diameter of 2 μm, and the resulting slurry was then poured into the integral honeycomb structured body and the aggregated honeycomb structured body, and dried at 200° C.

The above-mentioned processes were repeated until the alumina layer reached an amount of 60 g/L, and the resulting structured body was fired at 600° C.

$Ce(NO_3)_3$ was put into ethylene glycol, and stirred at 90° C. for 5 hours to prepare an ethylene glycol solution containing 6% by weight of $Ce(NO_3)_3$. The integral honeycomb structured body and the aggregated honeycomb structured body on which the alumina layer was formed were immersed in this ethylene glycol solution, and heated at 150° C. for 2 hours, and then heated at 650° C. for 2 hours in a nitrogen atmosphere, so that an alumina layer containing a rare-earth oxide to be used for supporting a catalyst on the surface of the ceramic fired body was formed.

Diamine dinitro platinum nitric acid ([Pt $(NH_3)_2(NO_2)_2$] $HNO_3$) having a platinum concentration of 4.53% by weight was diluted with distilled water, and the ceramic fired body on which the rare-earth oxide containing alumina layer was formed was immersed, and this was heated at 110° C. for 2 hours, and then heated at 500° C. for 1 hour in a nitrogen atmosphere, so that 2 g/L of platinum catalyst having an average particle diameter of 2 nm was supported on the surface of the ceramic fired body. Thus, the manufacturing processes for the integral honeycomb structured body and the aggregated honeycomb structured body on which the catalyst was supported were completed.

Examples 2 to 28

The same processes as Example 1 were carried out to manufacture integral honeycomb structured bodies and aggregated honeycomb structured bodies except that the cross-sectional shape perpendicular to the longitudinal direction and the height and the width of the protruded portion formed on the partition wall separating adjacent large-capacity through holes from each other were changed as shown in Table 1.

Here, the cross-sectional shape perpendicular to the longitudinal direction of the integral honeycomb structured body and the height of the protruded portion formed on the partition wall separating adjacent large-capacity through holes from each other were adjusted by changing the shape of a die for use in extrusion-molding of the mixture composition.

Reference Examples 1 to 4

The same processes as Example 1 were carried out to manufacture integral honeycomb structured bodies and aggregated honeycomb structured bodies except that the cross-sectional shape perpendicular to the longitudinal direction was changed into a shape as shown in Table 1 and that a recessed portion having a depth of 0.1 mm as shown in FIG. 1C was formed at the partition wall separating large-capacity through holes from each other.

Here, the cross-sectional shape perpendicular to the longitudinal direction of the integral honeycomb structured body and the depth of the recessed portion formed at the partition wall separating adjacent large-capacity through holes from each other were adjusted by changing the shape of a die for use in extrusion-molding of the mixture composition.

Reference Examples 5 to 8

The same processes as Example 1 were carried out to manufacture integral honeycomb structured bodies and aggregated honeycomb structured bodies except that the cross-sectional shape perpendicular to the longitudinal direction, the height of a protruded portion formed on the partition wall separating adjacent large-capacity through holes from each other and the amount of the alumina coat layer were changed as shown in Table 1.

Here, the cross-sectional shape perpendicular to the longitudinal direction of the integral honeycomb structured body and the height of a protruded portion formed on the partition wall separating adjacent large-capacity through holes from each other were adjusted by changing the shape of a die for use in extrusion-molding of the mixture composition.

Comparative Examples 1 to 7

The same processes as Example 1 were carried out to manufacture integral honeycomb structured bodies and aggregated honeycomb structured bodies except that the cross-sectional shape perpendicular to the longitudinal direction of the integral honeycomb structured body was changed as shown in Table 1 in a manner in which neither a protruded portion nor a recessed portion was formed on the partition wall separating adjacent large-capacity through holes from each other.

Here, the cross-sectional shape perpendicular to the longitudinal direction of the integral honeycomb structured body and the height of a protruded portion formed on the partition wall separating adjacent large-capacity through holes from each other were adjusted by changing the shape of a die for use in extrusion-molding of the mixture composition.

(Evaluation 1; Pressure Loss)

As shown in FIG. 7, each of the aggregated honeycomb structured bodies of the examples, reference examples and comparative examples was placed in an exhaust passage of an engine to form an exhaust gas purifying (converting) device, and the engine was driven at the revolutions of 3000 $min^{-1}$ and a torque of 50 N·m so that the aggregated honeycomb structured body was allowed to collect particulates of 8 g/L, and the pressure loss of the resulting honeycomb structured body was then measured. Table 2 shows the results.

(Evaluation 2; CO-Light Off Temperature, HC-Light Off Temperature)

Each of the integral honeycomb structured bodies of the examples, reference examples and comparative examples was placed in a reaction tester, and a simulation gas, which had component concentrations of $C_3H_6$ (200 ppm), CO (300 ppm), NOx (160 ppm), SOx (8 ppm), $CO_2$ (0.038%), $H_2O$ (10%) and $O_2$ (13%), was introduced into the integral honeycomb structured body at a space velocity (SV) of 45000/h so that, as the temperature of the simulation gas was gradually raised, the gas concentrations before and after the introduction of the gas into the honeycomb structured body were analyzed. Then, the temperatures at which the converting rates of CO and HC respectively reached 50% were defined as CO-Light off temperature and HC-Light off temperature. Table 2 shows the results.

Here, with respect to the measuring device, a MEXA-7500D (MOTOR EXHAUST GAS ANALYZER, manufactured by Horiba Ltd.) was used. In this device, CO, $CO_2$ and $SO_2$ were detected by NDIR (Non-Dispersive Infrared-absorbing system), $O_2$ was detected by MPOP (Magnetic Pressure System), HC was detected by FID (Hydrogen Flame Ionization Detector), and NOx was detected by CLD.

(Evaluation 3; Filter Regenerating Test)

As shown in FIG. 7, each of the aggregated honeycomb structured bodies of the examples, reference examples and comparative examples was placed in an exhaust passage of an engine to form an exhaust gas purifying (converting) device, and the engine was driven so that the aggregated honeycomb structured body was allowed to collect particulates of 7 g/L. Next, the aggregated honeycomb structured body that had collected particulates was placed in a reaction tester so that the temperature of the aggregated honeycomb structured body was maintained at 200° C., with nitrogen gas being introduced into the aggregated honeycomb structured body at a flow rate of 130 L/min.

Next, a simulation gas, which had approximately the same composition as exhaust gases of a diesel engine except that no particulates were contained therein, was introduced into the aggregated honeycomb structured body under conditions of a temperature of 650° C., a pressure of 8 kPa and a flow time of 7 minutes so that particulates were burned. In this case, a honeycomb catalyst supporting body (diameter: 144 mm, length: 100 mm, cell density: 400 cells/inch, platinum: 5 g/L), made of commercial cordierite, was placed at the simulation gas flow-in side of the aggregated honeycomb structured body, and the simulation gas that had passed through the honeycomb supporting body was introduced into the aggregated honeycomb structured body.

Lastly, the weight of the aggregated honeycomb structured body was measured to find out a rate (filter regenerating rate) of burned particulates to the collected particulates of 7 g/L so that the purifying (converting) performance of particulates was evaluated. Table 2 shows the results.

Here, the simulation gas had component concentrations of $C_3H_6$ (6540 ppm), CO (5000 ppm), NOx (160 ppm), SOx (8 ppm), $CO_2$ (0.038%), $H_2O$ (10%) and $O_2$ (10%). Moreover, the introduction of the simulation gas heated the aggregated honeycomb structured body to about 600° C.

TABLE 1

Figure 4E:
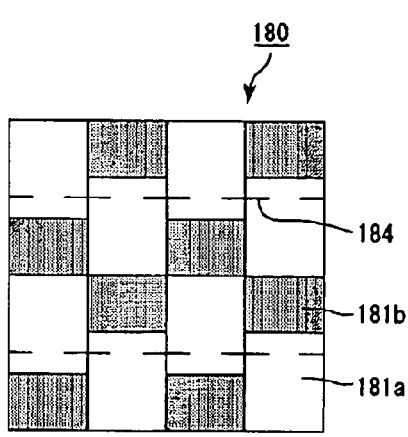
Figure 4F:
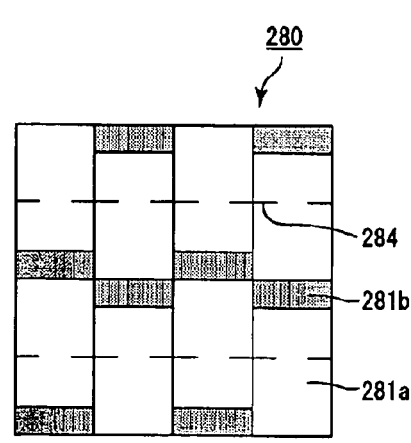

| | Cross-sectional shape of honeycomb structured body | Aperture ratio α (%) | Ratio of aperture ratios | Height of protruded portion (mm) | Width of protruded portion (mm) | Amount of $Al_2O_3$ coat (g/L) |
|---|---|---|---|---|---|---|
| Example 1 | FIG. 3A | 37.97 | 1.55 | 0.1 | 0.3 | 60 |
| Example 2 | | | | 0.3 | 0.3 | 60 |
| Example 3 | | | | 0.6 | 0.3 | 60 |
| Example 4 | FIG. 3B | 44.79 | 2.54 | 0.1 | 0.3 | 60 |
| Example 5 | | | | 0.3 | 0.3 | 60 |
| Example 6 | | | | 0.6 | 0.3 | 60 |
| Example 7 | FIG. 3C | 51.77 | 4.45 | 0.1 | 0.3 | 60 |
| Example 8 | | | | 0.3 | 0.3 | 60 |
| Example 9 | | | | 0.6 | 0.3 | 60 |
| Example 10 | FIG. 3D | 59.04 | 6 | 0.1 | 0.3 | 60 |
| Example 11 | | | | 0.3 | 0.3 | 60 |
| Example 12 | | | | 0.6 | 0.3 | 60 |
| Example 13 | FIG. 4A | 51.77 | 4.45 | 0.1 | 0.3 | 60 |
| Example 14 | | | | 0.3 | 0.3 | 60 |
| Example 15 | | | | 0.6 | 0.3 | 60 |
| Example 16 | FIG. 4C | 51.77 | 4.45 | 0.1 | 0.3 | 60 |
| Example 17 | | | | 0.3 | 0.3 | 60 |
| Example 18 | | | | 0.6 | 0.3 | 60 |
| Example 19 | FIG. 4E | 51.77 | 4.45 | 0.1 | 0.3 | 60 |
| Example 20 | | | | 0.3 | 0.3 | 60 |
| Example 21 | | | | 0.6 | 0.3 | 60 |
| Example 22 | FIG. 5 | 51.77 | 4.45 | 0.1 | 0.3 | 60 |
| Example 23 | | | | 0.3 | 0.3 | 60 |
| Example 24 | | | | 0.6 | 0.3 | 60 |
| Example 25 | FIG. 3A | 37.97 | 1.55 | 0.3 | 0.6 | 60 |
| Example 26 | FIG. 3B | 44.79 | 2.54 | 0.3 | 0.6 | 60 |
| Example 27 | FIG. 3C | 51.77 | 4.45 | 0.3 | 0.6 | 60 |
| Example 28 | FIG. 3D | 59.04 | 6 | 0.3 | 0.6 | 60 |
| Reference Example 1 | FIG. 1C | 37.97 | 1.55 | 0.1* | 0.3 | 60 |
| Reference Example 2 | FIG. 1C | 44.79 | 2.54 | 0.1* | 0.3 | 60 |
| Reference Example 3 | FIG. 1C | 51.77 | 4.45 | 0.1* | 0.3 | 60 |

TABLE 1-continued

|  | Cross-sectional shape of honeycomb structured body | Aperture ratio α (%) | Ratio of aperture ratios | Height of protruded portion (mm) | Width of protruded portion (mm) | Amount of Al₂O₃ coat (g/L) |
|---|---|---|---|---|---|---|
| Reference Example 4 | FIG. 1C | 59.04 | 6 | 0.1* | 0.3 | 60 |
| Reference Example 5 | FIG. 3A | 37.97 | 1.55 | 0.3 | 0.3 | 30 |
| Reference Example 6 | FIG. 3B | 44.79 | 2.54 | 0.3 | 0.3 | 30 |
| Reference Example 7 | FIG. 3C | 51.77 | 4.45 | 0.3 | 0.3 | 30 |
| Reference Example 8 | FIG. 3D | 59.04 | 6 | 0.3 | 0.3 | 30 |
| Comparative Example 1 | FIG. 3A | 37.97 | 1.55 | 0 | 0 | 60 |
| Comparative Example 2 | FIG. 3B | 44.79 | 2.54 | 0 | 0 | 60 |
| Comparative Example 3 | FIG. 3C | 51.77 | 4.45 | 0 | 0 | 60 |
| Comparative Example 4 | FIG. 3D | 59.04 | 6 | 0 | 0 | 60 |
| Comparative Example 5 | FIG. 4A | 51.77 | 4.45 | 0 | 0 | 60 |
| Comparative Example 6 | FIG. 4C | 51.77 | 4.45 | 0 | 0 | 60 |
| Comparative Example 7 | FIG. 4E | 51.77 | 4.45 | 0 | 0 | 60 |
| Comparative Example 8 | FIG. 5 | 51.77 | 4.45 | 0 | 0 | 60 |

Note)
*Depth of recessed portion (groove) (mm)

TABLE 2

|  | Pressure loss (kPa) | CO-Light off temperature (° C.) | HC-Light off temperature (° C.) | Filter regenerating rate (%) |
|---|---|---|---|---|
| Example 1 | 9.8 | 149 | 188 | 77 |
| Example 2 | 9.6 | 147 | 186 | 79 |
| Example 3 | 9.4 | 143 | 184 | 84 |
| Example 4 | 9.5 | 152 | 192 | 82 |
| Example 5 | 9.4 | 149 | 190 | 85 |
| Example 6 | 9.2 | 147 | 187 | 89 |
| Example 7 | 9.7 | 156 | 197 | 74 |
| Example 8 | 9.5 | 153 | 195 | 77 |
| Example 9 | 9.3 | 150 | 192 | 83 |
| Example 10 | 10.2 | 160 | 203 | 70 |
| Example 11 | 10.1 | 156 | 200 | 72 |
| Example 12 | 9.9 | 153 | 198 | 78 |
| Example 13 | 10.3 | 159 | 197 | 69 |
| Example 14 | 10.0 | 155 | 195 | 72 |
| Example 15 | 9.8 | 152 | 193 | 76 |
| Example 16 | 10.0 | 154 | 195 | 83 |
| Example 17 | 9.8 | 151 | 192 | 86 |
| Example 18 | 9.6 | 149 | 190 | 91 |
| Example 19 | 10.1 | 155 | 197 | 73 |
| Example 20 | 9.8 | 153 | 195 | 75 |
| Example 21 | 9.7 | 150 | 192 | 79 |
| Example 22 | 10.9 | 159 | 205 | 68 |
| Example 23 | 10.6 | 157 | 201 | 71 |
| Example 24 | 10.4 | 155 | 199 | 75 |
| Example 25 | 9.8 | 151 | 190 | 82 |
| Example 26 | 9.5 | 152 | 193 | 87 |
| Example 27 | 9.7 | 155 | 199 | 82 |
| Example 28 | 10.3 | 158 | 204 | 77 |
| Reference Example 1 | 9.9 | 150 | 190 | 78 |
| Reference Example 2 | 9.7 | 154 | 193 | 83 |
| Reference Example 3 | 9.8 | 157 | 199 | 77 |
| Reference Example 4 | 10.2 | 161 | 205 | 72 |
| Reference Example 5 | 7.8 | 150 | 188 | 65 |
| Reference Example 6 | 7.5 | 151 | 193 | 71 |
| Reference Example 7 | 7.7 | 156 | 197 | 63 |
| Reference Example 8 | 8.1 | 157 | 202 | 60 |
| Comparative Example 1 | 11.3 | 150 | 190 | 58 |
| Comparative Example 2 | 11.1 | 153 | 193 | 55 |
| Comparative Example 3 | 11.4 | 157 | 200 | 52 |
| Comparative Example 4 | 11.8 | 162 | 205 | 54 |
| Comparative Example 5 | 11.7 | 157 | 200 | 50 |
| Comparative Example 6 | 13.0 | 153 | 198 | 55 |
| Comparative Example 7 | 11.5 | 156 | 199 | 51 |
| Comparative Example 8 | 13.3 | 159 | 203 | 49 |

As shown in Table 1 and Table 2, in each of aggregated honeycomb structured bodies according to the examples in which the partition wall separating adjacently located large-capacity through holes is provided with a protruded portion or a recessed portion that serves as a selective catalyst supporting portion, a pressure loss is lower even after a certain amount of particulates were collected, and the regenerating rate of the filter is improved in comparison with aggregated honeycomb structured bodies according to comparative examples in which neither a protruded portion nor a recessed portion is formed on the partition wall separating adjacently located large-capacity through holes from each other.

Moreover, in each of aggregated honeycomb structured bodies according to the examples in which the partition wall separating adjacent large-capacity through holes from each other is provided with a protruded portion or a recessed portion that serves as a selective catalyst supporting portion, both of the CO-Light off temperature and HC-Light off temperature are slightly lowered in comparison with aggregated honeycomb structured bodies according to comparative examples in which neither a protruded portion nor a recessed portion is formed on the portion of the partition wall separating adjacent large-capacity through holes from each other.

What is claimed as new and desired to be secured by Letters Patent of the United States is:

1. A pillar-shaped honeycomb structured body, comprising:
 a large number of through holes having two end portions that are longitudinally placed in parallel with one another with a partition wall therebetween,
 wherein said large number of through holes comprises a group of large-capacity through holes being sealed at one of end portions and a group of small-capacity through holes being sealed at the other end portion, the total areas of the large-capacity through holes on a cross section perpendicular to the longitudinal direction of the through holes is larger than the total areas of the small-capacity through holes on the same cross section;
 a catalyst;
 a partition wall A that separates two adjacent large-capacity through holes provided with a selective catalyst supporting portion used for selectively supporting the catalyst; and
 a partition wall B that separates a large-capacity through hole and a small-capacity through hole that are adjacent to each other,
 wherein the selective catalyst supporting portion comprises a protruded portion or a recessed portion or both on a surface of the partition wall A, the partition wall A having a thickness which varies along the protruded portion and the recessed portion, and the partition wall A supports a larger amount of the catalyst than the partition wall B.

2. The honeycomb structured body according to claim 1, wherein said catalyst comprises at least one kind selected from the group consisting of a noble metal, an alkali metal, an alkaline earth metal, a rare-earth element, and a transition metal element.

3. The honeycomb structured body according to claim 2, wherein said noble metal comprises at least one kind selected from the group consisting of platinum, palladium, and rhodium.

4. The honeycomb structured body according to claim 1, wherein the protruded portion on the surface of the partition wall A has a shape widened toward the base.

5. The honeycomb structured body according to claim 1, wherein more than one protruded portions are on the surface of the partition wall A.

6. The honeycomb structured body according to claim 1, wherein the shape of the recessed portion on the surface of the partition wall A is a concave shape or a grooved shape.

7. The honeycomb structured body according to claim 1, wherein protruded portion or recessed portion or both on the surface of the partition wall A are continuous through the full length of the large capacity through holes the partition wall A separates from the end on the inlet side of said through hole to the end on the outlet side of said through hole.

8. The honeycomb structured body according to claim 1, wherein the protruded portion on the surface of the partition wall A has a height of at least about 0.02 time and at most about 6 times the thickness of the partition wall A.

9. The honeycomb structured body according to claim 1, wherein the recessed portion on the surface of the partition wall A has a depth of at least about 0.02 time and at most about 0.4 time the thickness of the partition wall A.

10. The honeycomb structured body according to claim 1, wherein a thickness of the partition wall A is at least about 0.2 mm and at most about 1.2 mm.

11. The honeycomb structured body according to claim 1, wherein a thickness of the partition wall A is larger than a thickness of the partition wall B.

12. The honeycomb structured body according to claim 1, wherein the cross-sectional shape of the large-capacity through holes or the cross-sectional shape of the small-capacity through holes perpendicular to the longitudinal direction of the through holes has a polygonal shape.

13. The honeycomb structured body according to claim 1, wherein the cross-sectional shape of the large-capacity through holes perpendicular to the longitudinal direction of the through holes is an octagonal shape, and the cross-sectional shape of the small-capacity through holes perpendicular to the longitudinal direction of the through holes is a quadrangular shape.

14. The honeycomb structured body according to claim 1, wherein a ratio of the total areas of the large-capacity through holes on a cross section perpendicular to the longitudinal direction to the total areas of the small-capacity through holes on the same cross section is at least about 1.5 and at most about 2.7.

15. The honeycomb structured body according to claim 1, wherein said honeycomb structured body is mainly made from a porous ceramic material.

16. The honeycomb structured body according to claim 15, wherein said honeycomb structured body comprises at least one kind selected from the group consisting of nitride ceramics, carbide ceramics, and oxide ceramics.

17. The honeycomb structured body according to claim 15, wherein a porosity of said honeycomb structured body is at least about 20% and at most about 80%.

18. The honeycomb structured body according to claim 15, wherein an average pore diameter of said honeycomb structured body is at least about 1 μm and at most about 100 μm.

19. The honeycomb structured body according to claim 1, wherein, on the cross section perpendicular to the longitudinal direction of the through holes, at least one of angles formed by crossing of the partition wall A and the partition wall B is an obtuse angle.

20. The honeycomb structured body according to claim 1, wherein, on the cross section perpendicular to the longitudinal direction of the through holes, the corners of the large-capacity through hole and/or the small capacity through hole are curvilinear.

21. The honeycomb structured body according to claim 1, wherein the distance between centers of gravity on a cross section perpendicular to the longitudinal direction of adjacent large-capacity through holes is equal to the distance between centers of gravity on a cross section perpendicular to the longitudinal direction of adjacent small-capacity through holes.

22. The honeycomb structured body according to any one of claim 1, which is used for an exhaust gas purifying device in a vehicle.

23. A honeycomb structured body, comprising:
a honeycomb block formed by combining a plurality of the honeycomb structured bodies according to any one of claim 1 together through a sealing material layer; and
a sealing material layer that is formed on the peripheral face of said honeycomb block,
wherein the sealing material layer is made from a material that is more impervious to gases in comparison with said honeycomb structured body.

24. The honeycomb structured body according to claim 23, which is used for an exhaust gas purifying device in a vehicle.

* * * * *